US010000656B2

United States Patent
Yanagawa et al.

(10) Patent No.: US 10,000,656 B2
(45) Date of Patent: Jun. 19, 2018

(54) INK, RECORDED MATTER, INK CONTAINER, RECORDING DEVICE, AND RECORDING METHOD

(71) Applicants: Yoshiki Yanagawa, Shizuoka (JP);
Akihiko Matsuyama, Shizuoka (JP);
Kazukiyo Nagai, Shizuoka (JP);
Tomoyuki Shimada, Shizuoka (JP);
Shigeyuki Harada, Shizuoka (JP);
Akiyoshi Sabu, Kanagawa (JP);
Yuusuke Koizuka, Shizuoka (JP);
Koichiro Oyama, Kanagawa (JP);
Takuya Yamazaki, Shizuoka (JP)

(72) Inventors: Yoshiki Yanagawa, Shizuoka (JP);
Akihiko Matsuyama, Shizuoka (JP);
Kazukiyo Nagai, Shizuoka (JP);
Tomoyuki Shimada, Shizuoka (JP);
Shigeyuki Harada, Shizuoka (JP);
Akiyoshi Sabu, Kanagawa (JP);
Yuusuke Koizuka, Shizuoka (JP);
Koichiro Oyama, Kanagawa (JP);
Takuya Yamazaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 15/373,523

(22) Filed: Dec. 9, 2016

(65) Prior Publication Data
US 2017/0174918 A1    Jun. 22, 2017

(30) Foreign Application Priority Data

Dec. 16, 2015   (JP) ................................ 2015-245394
Feb. 19, 2016   (JP) ................................ 2016-030044

(51) Int. Cl.
*C09D 11/107*   (2014.01)
*C09D 11/30*    (2014.01)
(Continued)

(52) U.S. Cl.
CPC .......... *C09D 133/14* (2013.01); *C09D 11/107* (2013.01); *C09D 11/322* (2013.01)

(58) Field of Classification Search
None
See application file for complete search history.

(56) References Cited

U.S. PATENT DOCUMENTS 7,629,395 B2 *  12/2009  Nishiguchi .......... C09D 11/326
                                                       523/160
2009/0239981 A1*  9/2009  Morimoto .......... C09D 11/106
                                                       524/90
(Continued)

FOREIGN PATENT DOCUMENTS

| JP | 2003-171574 | 6/2003 |
| JP | 2007-063407 | 3/2007 |
| JP | 2009-227692 | 10/2009 |
| JP | 2009-227719 | 10/2009 |
| JP | 2011-105866 | 6/2011 |
| JP | 2011-225634 | 11/2011 |

*Primary Examiner* — Peter A Salamon
(74) *Attorney, Agent, or Firm* — Oblon, McClelland, Maier & Neustadt, L.L.P.

(57) ABSTRACT

An ink includes a pigment a quinacridone compound represented by Chemical formula 1, and a copolymer including the structure unit represented by Chemical formula 2 or Chemical formula 3.

Chemical formula 1

$$\left[ R^1 \underset{R^2}{\overset{O}{\underset{N}{\bigcirc\bigcirc\bigcirc}}} \underset{O}{\overset{H}{\underset{R^4}{R^3}}} \right] (CH_2-NH-\overset{O}{\overset{\|}{C}}-CH_2-NH-R^7-N\underset{R^6}{\overset{R^5}{\diagup}})_m$$

In Chemical formula 1, $R^1$, $R^2$, $R^3$, and $R^4$ each, independently represent hydrogen atoms, halogen atoms, or alkyl (Continued)

groups having 1-4 carbon atoms, $R^5$, $R^6$, and $R^7$ each, independently represent alkyl groups having 1-4 carbon atoms or alkylene groups having 1-4 carbon atoms, and m represents 1 or 2, Chemical formula 2

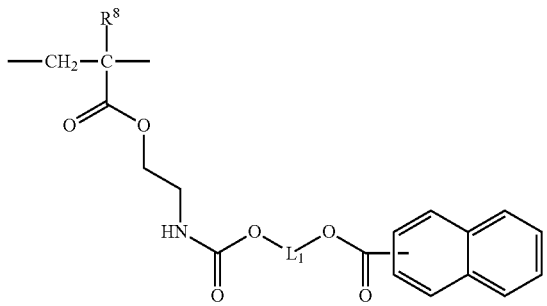

In Chemical formula 2, $R^8$ represents a hydrogen atom or a methyl group and $L_1$ represents an alkylene group having 2-16 carbon atoms, Chemical formula 3

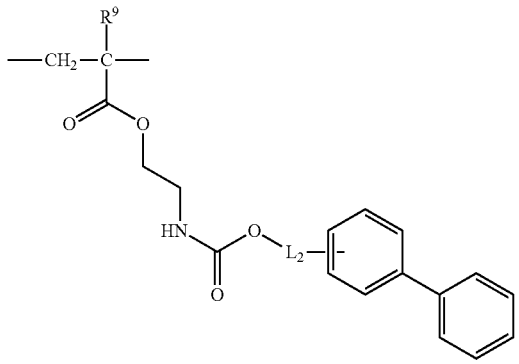

In Chemical formula 3, R9 represents a hydrogen atom or a methyl group, L2 represents a single bond or —$(CH_2)_n$—O— and n represents an integer of 2-16.

10 Claims, 2 Drawing Sheets

(51) Int. Cl.
*C09D 11/322* (2014.01)
*C09D 133/14* (2006.01)

(56) References Cited

U.S. PATENT DOCUMENTS

| | | | |
|---|---|---|---|
| 2012/0113195 A1* | 5/2012 | Katsuragi | C09D 11/38 347/86 |
| 2012/0328854 A1 | 12/2012 | Matsuyama et al. | |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2014/0198160 A1 | 7/2014 | Harada et al. | |
| 2014/0199530 A1 | 7/2014 | Katoh et al. | |
| 2014/0242352 A1* | 8/2014 | Naruse | C09D 11/30 428/195.1 |
| 2015/0056425 A1 | 2/2015 | Nagai et al. | |
| 2015/0064418 A1 | 3/2015 | Matsuyama et al. | |
| 2015/0064425 A1 | 3/2015 | Matsuyama et al. | |
| 2015/0109382 A1 | 4/2015 | Naruse et al. | |
| 2015/0116421 A1 | 4/2015 | Nonogaki et al. | |
| 2015/0125672 A1 | 5/2015 | Katoh et al. | |
| 2015/0247049 A1 | 9/2015 | Matsuyama et al. | |
| 2015/0252203 A1 | 9/2015 | Matsuyama et al. | |
| 2015/0259555 A1 | 9/2015 | Katoh et al. | |
| 2015/0291817 A1 | 10/2015 | Katoh et al. | |
| 2015/0307734 A1 | 10/2015 | Nonogaki et al. | |
| 2015/0376425 A1 | 12/2015 | Hakiri et al. | |
| 2016/0017075 A1 | 1/2016 | Harada et al. | |
| 2016/0032037 A1 | 2/2016 | Harada et al. | |
| 2016/0075882 A1 | 3/2016 | Harada et al. | |
| 2016/0102162 A1 | 4/2016 | Harada et al. | |
| 2016/0130452 A1 | 5/2016 | Katoh et al. | |
| 2016/0168292 A1 | 6/2016 | Fukuoka et al. | |
| 2016/0222234 A1 | 8/2016 | Matsuyama et al. | |

* cited by examiner

INK, RECORDED MATTER, INK CONTAINER, RECORDING DEVICE, AND RECORDING METHOD

CROSS-REFERENCE TO RELATED APPLICATIONS

This patent application is based on and claims priority pursuant to 35 U.S.C. § 119 to Japanese Patent Application Nos. 2015-245394 and 2016-030044, filed on Dec. 16, 2015 and Feb. 19, 2016, respectively, in the Japan Patent Office, the entire disclosures of which is hereby incorporated by reference herein.

BACKGROUND

Technical Field

The present invention relates to an ink, recorded matter, an ink container, a recording device, and a recording method.

Description of the Related Art

Inkjet recording methods have advantages such that the process is simple and full colorization is easy in comparison with other recording methods. Therefore, high resolution images can be obtained by a device having a simple configuration. For this reason, the inkjet recording is widely diffusing from home use to office use, commercial printing, and industrial printing. In such an inkjet recording method, an aqueous ink composition using a water soluble dye as a coloring material are commonly used. However, its water resistance and light resistance are inferior so that pigment ink using a water insoluble pigment is under development to substitute the water soluble dye.

For inkjet ink printing for office use, recording media, typically plain paper, are used and high image density is demanded. In general, when images are printed on plain paper using pigment ink, the pigment ink does not stay on the surface of the paper but permeates into the paper, so that the density of the pigment on the surface decreases and consequently the image density lowers. The image density increases if the pigment concentration in the ink is increased. However, the ink becomes viscous, thereby degrading the discharging stability of the ink.

In attempts to improve the print performance, a measure for quick drying in which a permeating agent such as a hydrophobic solvent, etc., is added to an ink to permeate water into a recording medium has been taken to speed up drying of the ink attached to a recording medium. For this reason, dispersion stability in an environment including both a pigment dispersion of a water solvent and an ink of a hydrophobic solvent is required.

In addition, unlike an aqueous dye ink prepared by dissolving a dye in water, the aqueous pigment ink for use in the inkjet recording method described above or pens and pencils requires stable dispersion of an water-insoluble pigment in water for a long period of time. Therefore, various pigment dispersants have been developed.

SUMMARY

According to the present invention, provided us an improved ink including a pigment, a quinacridone compound represented by Chemical formula 1, and a copolymer including the structure unit represented by Chemical formula 2 or Chemical formula 3.

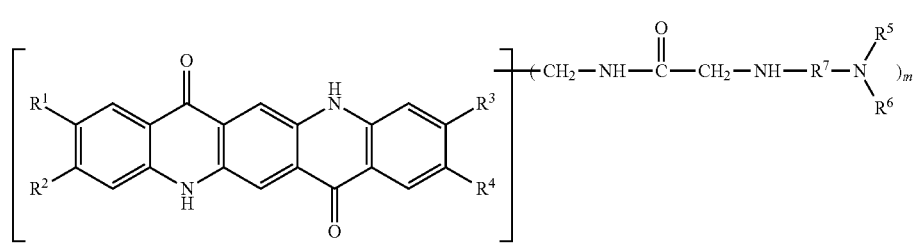

Chemical formula 1

In Chemical formula 1, $R^1$, $R^2$, $R^3$, and $R^4$ each, independently represent hydrogen atoms, halogen atoms, or alkyl groups having 1-4 carbon atoms, $R^5$, $R^6$, and $R^7$ each, independently represent alkyl groups having 1-4 carbon atoms or alkylene groups having 1-4 carbon atoms, and m represents 1 or 2,

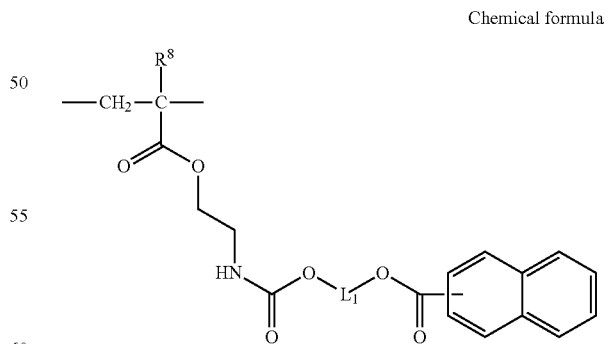

Chemical formula 2

In Chemical formula 2, $R^8$ represents a hydrogen atom or a methyl group and $L_1$ represents an alkylene group having 2-16 carbon atoms.

Chemical formula 3

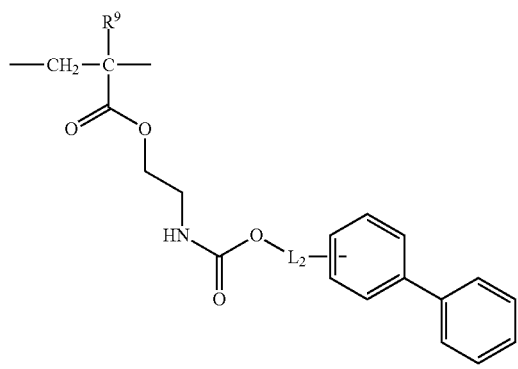

In Chemical formula 3, R9 represents a hydrogen atom or a methyl group, L2 represents a single bond or $-(CH_2)_n-O-$ and n represents an Integer of 2-16.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
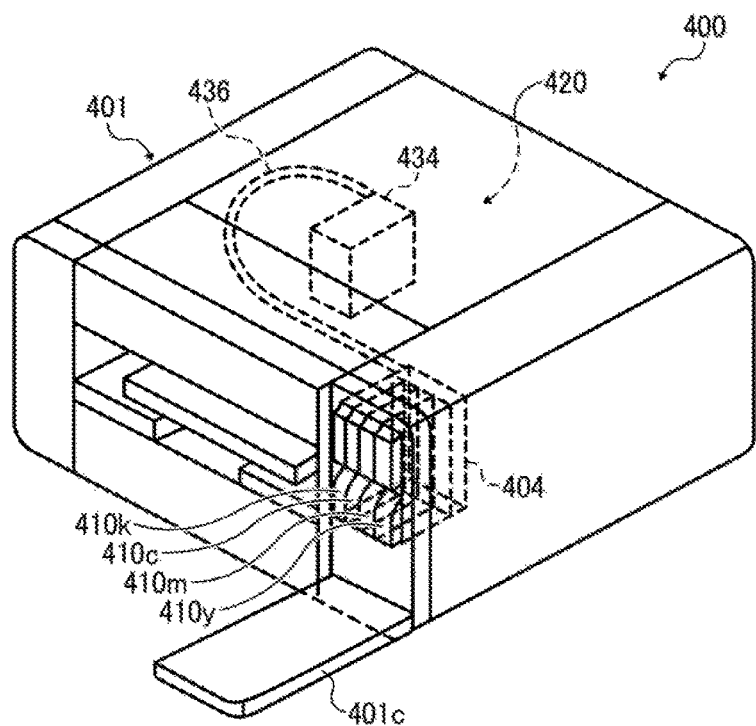
FIG. 1 is a schematic diagram illustrating a perspective view of an example of the inkjet recording device according to an embodiment of the present invention.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning.

The ink, recorded matter, ink container, recording device, and recording method are described with reference to the accompanying drawings. It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

The ink of the present disclosure includes a pigment, a quinacridone represented by the following formula 1, and a copolymer including a structure unit represented by the following Chemical formula 2 or Chemical formula 3.

Chemical formula 1

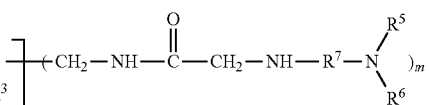

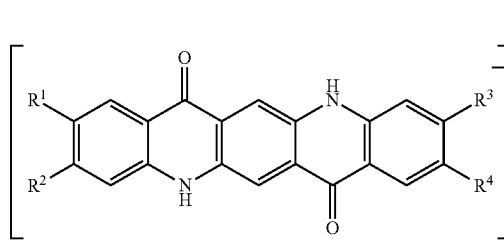

In the Chemical formula 1, $R^1$, $R^2$, $R^3$, and $R^4$ each, independently represent hydrogen atoms, halogen atoms, or alkyl groups having 1-4 carbon atoms, $R^5$, $R^6$, and $R^7$ each, independently represent alkyl groups or alkylene groups having 1-4 carbon atoms, and m represents 1 or 2, Chemical formula 2

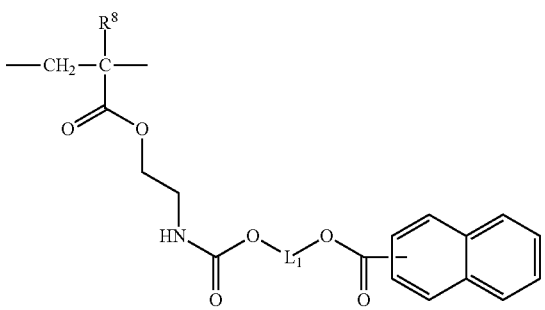

In the Chemical formula 2, $R^8$ represents a hydrogen atom or a methyl group and $L_1$ represents an alkylene group having 2 to 16 carbon atoms.

Chemical formula 3

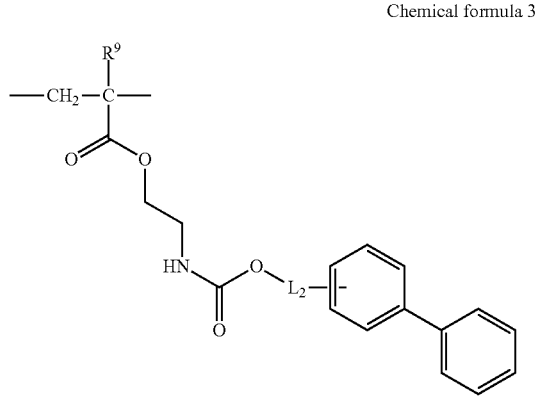

In the Chemical formula 3, $R^9$ represents a hydrogen atom or a methyl group, $L_2$ represents a single bond or $—(CH_2)_n—O—$ in which the oxygen atom bonds with a biphenyl. Also, "n" represents an integer of 2-16.

The content of the copolymer in the ink is not particularly limited when used as a pigment dispersant and can be suitably selected to suit to a particular application. It is preferably from 10-100 part by mass to 100 parts by mass of the pigment. When the content is within the range, a high image density is achieved. In addition, it is possible to use another dispersant in combination, preferably in the range not to have an adverse impact on the effect achieved by the dispersant of the copolymer.

The quinacridone compound represented by the Chemical formula 1 tends to be adsorbed to the surface of a pigment due to π-π stacking with the pigment as a coloring material in the ink. In particular, adsorption property is imparted to the quinacridone pigment due to hydrogen bond between molecules. For this reason, excellent adsorption property is demonstrated and good dispersibility is maintained. In addition, agglomeration of pigments is prevented by steric barrier of a substituent including a dialkyl amino group. Moreover, when used in combination with an anionic dispersant having a higher affinity, the dispersant is more firmly adsorbed to the surface of the pigment because of acid-base mutual function. Therefore, it is possible to maintain stable dispersion state for an extended period of time.

The number of the substitution group including a dialkyl amino group contained in the quinacridone compound represented by the Chemical formula 1 has a distribution depending on the manufacturing condition. The number of the substitution groups contained in the quinacridone compound is represented as an average unless separated and refined in particular. The average introducing number is preferably 0.5-3.0 and more preferably 1.0-2.0. When the number of the substitution groups is small, the reforming of the surface of a pigment is not demonstrated well. When the number of the substitution groups is large, the reforming effect is good but bleed may occur because affinity with a medium becomes strong.

In the Chemical formula 1, the alkyl groups of $R^1$, $R^2$, $R^3$, and $R^4$ and the alkyl groups of $R^5$, $R^6$, and $R^7$ each, independently represent methyl groups, ethyl groups, propyl groups, and butyl groups having 1-4 carbon atoms.

The substitution groups including dialkylamino groups is inferred to bond at the site of the aromatic ring of the quinacridone backbone. This does not exclude the groups bonded at the site of NH.

In the Chemical formula 2 and the Chemical formula 3, $R_8$ and $R_9$ each, independently represent hydrogen atoms or methyl groups. $L_1$ is an alkylene group having 2 to 16 carbon atoms and preferably an alkylene group having 2 to 12 carbon atoms. $L_2$ represents a single bond or $—(CH_2)_n—O—$ in which the oxygen atom bonds with a biphenyl where n represents an integer of 2-16.

The naphtyl group and the biphenyl group existing at the distal end via L having an open end (in other words, pendant structure portion) have an excellent pigment adsorption power due to π-π stacking with pigments serving as a coloring material in an aqueous ink.

As understood from the description "naphtyl group and biphenyl group existing at the distal end via L in the pendant", the structure unit represented by the Chemical formula 2 or the Chemical formula 3 may be typically the main chain of the copolymer having a naphthyl group, a biphenyl group, etc. pendulating via $L_1$ and $L_2$ or a carboxylic group having a pendant group etc. in a side chain. However, this does not exclude cases in which a portion is included in such a side chain. For example, it is well known that it is difficult to completely exclude additional radical polymerization reaction that produces fork structures.

In addition, when a pigment dispersion in which a pigment is dispersed in water is prepared with the copolymer of the present disclosure, the copolymer tends to be adsorbed to the surface of the pigment due to the naphtyl group and biphenyl group present at the distal end of the side chain of the copolymer and the adsorption power with the pigment is so strong that the obtained dispersion is stabilized with a good dispersibility for an extended period of time.

Therefore, according to the present disclosure, the pigment dispersion including a pigment, the quinacridone compound represented by the Chemical formula 1, and the copolymer having a structure unit represented by the Chemical formula 2 or the Chemical formula 3 is stable with a high dispersibility for an extended period of time. Accordingly, good storage stability is secured. Therefore, when an ink is prepared by using such a pigment dispersion, good storage stability and discharging stability are obtained at a higher level.

The mass average molecular mass Mw of the copolymer is 4,000-80,000, preferably 5,000 to 60,000, and more preferably 7,000 to 40,000. When the molecular mass is 4,000 or greater, dispersion stability is improved due to stent barrier of the copolymer. In addition, when the Mw is 80,000 or less, entanglement of the copolymer less occurs, thereby suppressing an increase of the viscosity. As a result, discharging stability is improved.

The mass average molecular mass of the copolymer can be controlled in some degree by polymerization temperature, proportion of a polymerization initiator, and monomer density during reaction. With regard to the polymerization temperature, a polymer having a low molecular mass is easily obtained by polymerization at high temperatures for a short period of time. By contrast, a copolymer having a high molecular mass tends to be obtained by polymerization at low temperatures for a long period of time.

A pigment can be more stably dispersed under the presence of an ink solvent in a combinational use of the quinacridone compound represented by the Chemical formula 1 and the copolymer.

In addition, when ink is dried at a head nozzle part, etc. in an inkjet printer and the proportion of solid portion in the ink increases, the pigment particle is aggregated. At this time, a cross-linking agglomeration occurs due to the copolymer haying a structure unit represented by the Chemical formula 2 or the Chemical formula 3, which may degrade re-dispersibility of the pigment. However, this cross-linking between pigments caused by the copolymer can be prevented by the combinational use with the quinacridone compound having a steric barrier represented by the Chemical formula 1. Due to the improvement on re-dispersibility, the stable pigment dispersion state can be re-created quickly by head cleaning even after the ink is dried. That is, excellent discharging reliability is demonstrated.

The quinacridone compound represented by the Chemical formula 1 has at least one peak selected from positive ion molecule peaks of 483.6-485.6, 511.6-513.6, 552.5-554.5, 654.8-656.8, 682.9-684.9, and 723.7-725.7 and negative ion molecule peaks of 481.6-483.6, 509.6-511.6, 550.5-552.5, 652.8-654.8, 680.9-682.9, and 721.7-723.7 as measured by matrix assisted laser desorption ionization time of flight mass spectrometry (MALDI-TOFMS-MS). When these peaks appear, it can be said that quinacridone compounds are contained in which $R^1$, $R^2$, $R^3$, and $R^4$ in the Chemical formula 1 are one of hydrogen atoms, methyl groups or chloro groups, and m is 1 or 2. When a compound in which m is 1 is included, a positive ion molecule peak of 483.6-485.6 and/or a negative ion peak of 481.6-483.6, a positive ion molecule peak of 511.6-513.6 and/or a negative ion peak of 509.6-511.6 or a positive ion molecule peak of 552.5-554.5 and/or a negative ion peak of 550.5-552.5 are observed.

When the compound in which m is 2 is included, a positive ion molecule peak of 654.8-656.8 and/or a negative ion peak of 652.8-654.8, a positive ion molecule peak of 682.9-684.9 and/or a negative ion peak of 680.9-682.9, or a positive ion molecule peak of 723.7-725.7 and/or a negative ion peak of 721.7-723.7 are observed.

Mass spectrometry by matrix, assisted laser desorption ionization time of flight mass spectrometry (MALDI-TOFMS-MS) is conducted by, for example, a matrix assisted laser desorption ionization time of flight mass spectrometer (MALDI-TOFMS, autoflex III, manufactured by Bruker Daltonics K.K.).

The copolymer of the present disclosure preferably has a structure unit formed of other hydrophilic polymerizable monomers in addition to the structure unit represented by Chemical formula 2 or Chemical formula 3.

Specific examples of the hydrophilic polymerizable monomers include, but are not limited to, anionic unsaturated ethylene monomers such as (meth)acrylic acid or salts thereof, maleic acid or salts thereof, monomethyl maleate, itaconic acid, monomethyl itaconate, fumaric acid, 4-styrene sulfonic acid, 2-acrylamide-2-methyl propane sulfonic acid, or anionic unsaturated ethylene monomers having phosphoric acid, phosphonic acid, alendronic acid, or etidronic acid; and nonionic unsaturated ethylene monomers such as (meth)acrylic acid-2-hydroxyethyl, diethylene glycol mono (meth)acrylate, triethylene glycol mono(meth)acrylate, tetraethylene glycol mono(meth)acrylate, polyethyleneglycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide; and cationic unsaturated ethylene monomers such as dimethylaminoethyl (meth)acrylamide, dimethylaminopropyl (meth)acrylamide, and methacroylcholine chloride.

The copolymer for use in the present disclosure may furthermore include repeating units formed of other polymerizable monomers. The copolymer may be formed of the structure unit represented by the Chemical formula 2 and the structure unit represented by the Chemical formula 3. Alternatively, the copolymer may be formed of the structure unit represented by the Chemical formula 2 or the Chemical formula 2 and another hydrophilic polymerizable monomer or another polymerizable monomer.

Such other polymerizable monomers are not particularly limited and can be suitably selected to suit to a particular application. Examples are hydrophobic polymerizable monomers, polymerizable surfactants.

Specific examples of the hydrophobic monomers include, but are not limited to, unsaturated ethylene monomers having aromatic ring such as α-methyl styrene, 4-t-butyl styrene, and 4-chloromethyl styrene; (meth)acrlic acid alkyl such as methyl (meth)acrylate, ethyl(meth)acrylate, n-butyl (meth)acrylate, dimethyl maleate, dimethyl itaconate, dimethyl fumarate, lauryl(meth)acrylate (C12), tridecyl(meth) acrylate (C13), tetradecyl(meth)acrylate (C14), pentadecyl (meth)acrylate (C15), hexadecyl(meth)acrylate (C16), heptadecyl(meth)acrylate (C17), nonadecyl(meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptane, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene and 1-dococene. These may be used alone or in combination of two or more thereof.

Taking into account the mentioned above, the copolymer including the structure unit represented by the Chemical formula 2 or the Chemical formula 3 preferably includes an anionic or nonionic group.

The polymerizable surfactant is, for example, an anionic or nonionic surfactant having at least one radically-polymerizable unsaturated double bond group in its molecule.

Examples of the anionic surfactant include, but are not limited to, a hydrocarbon compound having a sulfate group such as ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacylic group [($-CO-C(CH_3)=CH_2$], and an aromatic hydrocarbon compound having a sulfate group such as amnion tuna sulfate group ($-SO_3-NH_4^+$) and a 1-propenyl group ($-CH=CH_2CH_3$).

Specific examples include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_{n-H}$].

Specific examples include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

As the polymerizable surfactant, one or more kinds thereof are mixed and the mixture accounts for 0.1-10 percent by mass of the monomer represented by the structure unit represented by the Chemical formula 2 or the Chemical formula 3.

The structure of the copolymer can be analyzed by using a known analyzing method such as nuclear magnetic resonance (NMR) and infrared radiation (IR).

In addition, the molar ratio of the structure units constituting the copolymer can be obtained by the molar ratio of the monomers used at synthesis of the copolymer. In addition, it can be also obtained from the copolymer by using NMR.

The quinacridone compound represented by the Chemical formula 1 can be obtained by the reaction represented by the following reaction formula 1 and the reaction formula 2.

First, as illustrated in the following reaction formula 1, the quinacridone compound (A-1) and 2-chloro-N-(hydroxymethyl)acetoamide are caused to react in sulfuric acid followed by rinsing with water to obtain chloroacetoamide methylated quinacridone.

Next, as illustrated in the reaction formula 2, A-2 and diamine are caused to react to obtain the quinacridone mixture A-3 represented by the Chemical formula 1.

Reaction formula 1

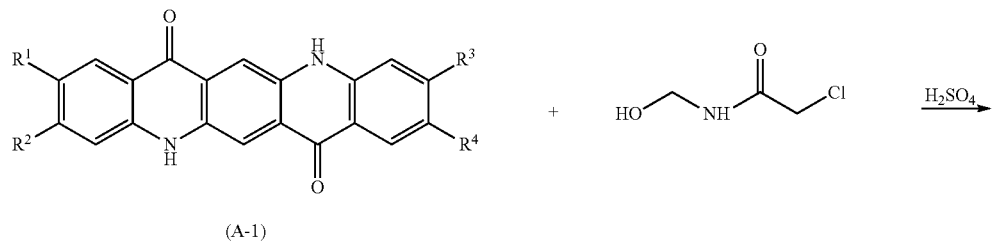

(A-1)

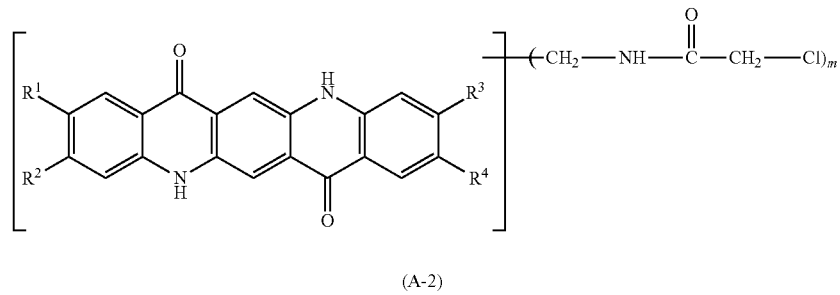

(A-2)

Reaction formula 2

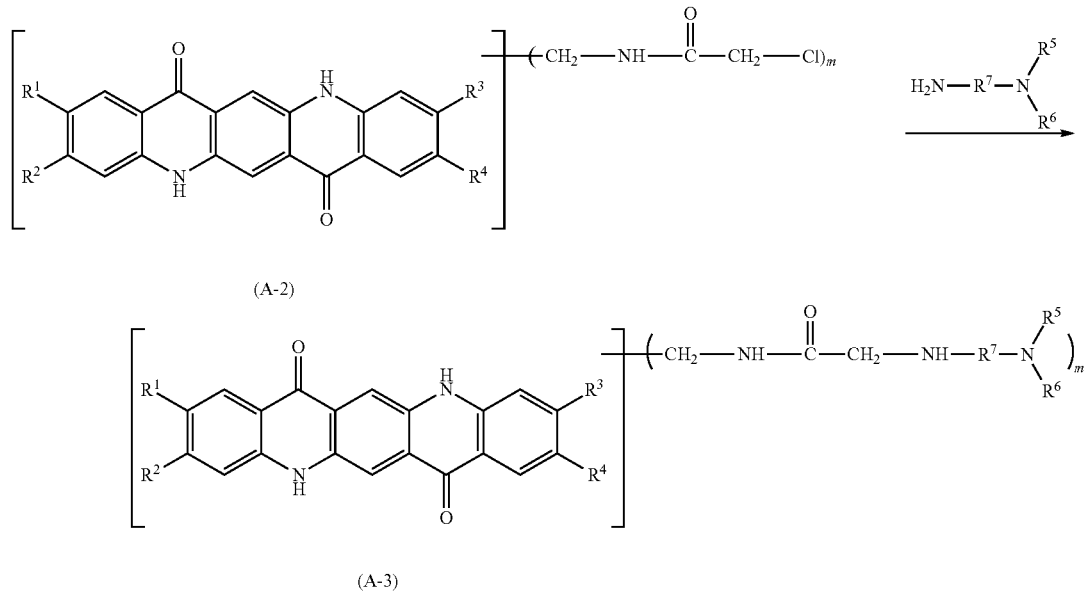

(A-2)

(A-3)

The Chemical formula 2 can be obtained by the reaction represented by the following reaction formula 3 and the reaction formula 4.

First, as in the reaction formula 3, naphthalene carboxylic acid hydroxyalkyl ester B-2 is obtained by condensation reaction between naphthalene carbonyl chloride B-1 and an excessive amount of a diol compound under the presence of an acid acceptor such as amine and pyridine.

Thereafter, as illustrated in the reaction formula 4, a monomer B-4 is obtained by reacting 2-methacryloyloxyethyl isocyanate B-3 and B-2.

Thereafter, the monomer B-4 and one or more kinds of monomers are copolymerized under the presence of a radical polymerization initiator to obtain the copolymer for use in the present disclosure. The molecular mass of the monomer B-4 is from 357-596 because $L_1$ in the Chemical formula 2 is an alkylene group having 2-16 carbon atoms and $R^8$ is a hydrogen atom or a methyl group.

Reaction formula 3

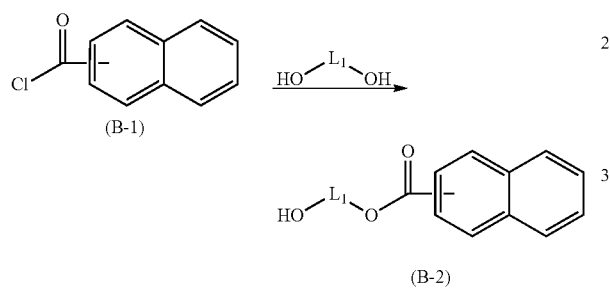

Reaction formula 4

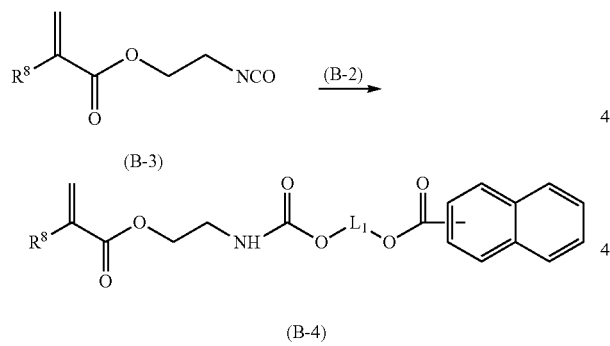

The Chemical formula 3 can be obtained by the reaction represented by the following reaction formula 5 and the reaction formula 6. In the Chemical formula 3, if $L_2$ is a single bond, as illustrated in the following, reaction formula 5, acryloyloxyethyl isocyanate compound C-1 and hydroxydibiphenyl compound C-2 are caused to react to obtain a monomer C-3. In addition, if $L_2$ is —$(CH_2)_n$—O— in which the oxygen atom bonds with a biphenyl and n is an integer of 2-16, as illustrated in the following reaction formula 6, acryloyloxyethyl isocyanate compound C-1 and hydroxydibiphenyl compound C-4 are caused to react to obtain a monomer C-5.

Thereafter, the monomer C-5 or the monomer C-5 and one or more kinds of monomers are copolymerized under the presence of a radical polymerization initiator to obtain the copolymer for use in the present disclosure.

Reaction formula 5

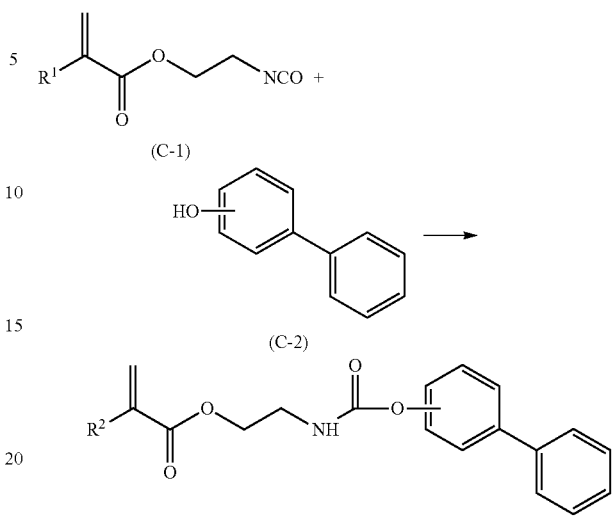

Reaction formula 6

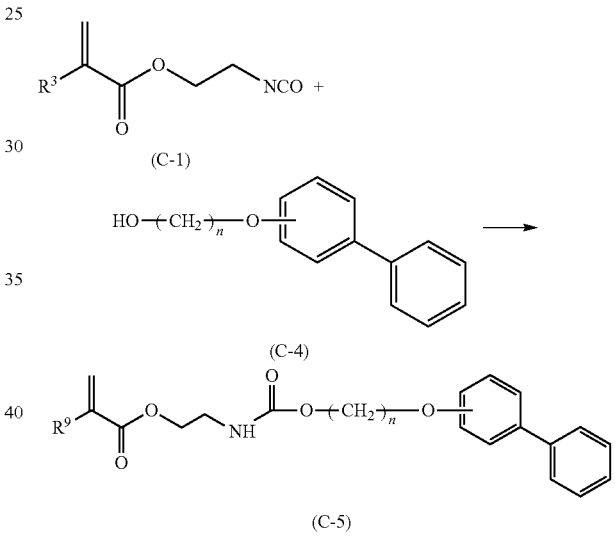

The radical polymerization initiator is not particularly limited and can be selected to a particular application.

Specific examples thereof include, but are not limited to, peroxy ketal, hydroperoxide, dialkylperoxide, diacylperoxide, peroxydicarbonate, peroxyester, cyano-based azobisisobutylonitrile, azobis(2-methylbutylonitrike), azobis(2, 2'-isovaleronitrile), and non-cyano-based dimethyl-2,2'-azobis isobutylate. Of these, in terms of easiness of molecular mass control and low dissolution temperature, organic peroxides and azo-based compounds are preferable and azo-based compounds are particularly preferable.

In addition, the proportion of the radical polymerization initiator is not particularly limited and can be suitably selected to suit to a particular application. The proportion is preferably 1-10 percent by mass based on the total content of the polymerizable monomer.

To control the molecular mass of the polymer, a chain transfer agent is optionally added.

Specific examples of the chain transfer agents include, but are not limited to, mercapto acetate, mercapto propionate, 2-propane thiol, 2-meracapto ethanol, thiophenol dodecyl mercaptane, 1-dodecane thiol, and thioglycerol.

The polymerization temperature is not particularly limited and can be suitably selected to a particular application. The polymerization temperature is preferably 50-150 degrees C. and more preferably 60-100 degrees C.

The polymerization time is not particularly limited. The polymerization time can be suitably selected to a particular application. It is preferably from 3 hours to 4 hours.

The mass ratio of the pigment constituting the ink of the present disclosure, the quinacridone compound represented by the Chemical formula 1, and the copolymer including the structure unit represented by the Chemical formula 2 or Chemical formula 3 is preferably in the following range in terms of the adsorption power of the quinacridone derivative mixture and the copolymer to the pigment.

That is, the mass ratio of the pigment:quinacridone derivative mixture:copolymer is preferably 70-100:0.1-20:5-100, more preferably 75-95:0.5-15:7.5-75, and furthermore preferably, 80-90:1-10:10-50.

Ink

The organic solvent, water, pigment, coloring material, and additives, etc. for use in the ink are described next.

Organic Solvent

There is no specific limitation on the type of the organic solvent used in the present disclosure. For example, water-soluble organic solvents are suitable.

Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol, polyol alkylethers such as ethylene glycol monoethylether, and ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the organic solvent series as a humectant and also imparts a good drying property, it is preferable to use an organic solvent having a boiling point of 250 degrees C. or lower.

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium (recording medium).

The proportion of the organic solvent in ink has no particular limit and can be suitably selected to suit to a particular application.

In terms of the drying property and discharging reliability of the ink, the proportion is preferably 10-60 percent by mass and more preferably 20-60 percent by mass.

Water

The proportion of water in the ink is not particularly limited and can be suitably selected to suit to a particular application. For example, in terms of the drying property and discharging reliability of the ink, the proportion is preferably 10-90 percent by mass and more preferably 20-60 percent by mass.

Pigment

Specific examples of the pigment capable of maintaining good dispersibility in a combinational use with the quinacridone compound represented by the Chemical formula 1 for use in the present disclosure include, but are not limited to, Pigment Red 4, 5, 9, 23, 48, 49, 52, 53, 57, 97, 112, 122, 123, 144, 146, 147, 149, 150, 166, 168, 170, 177, 180, 184, 185, 192, 202, 207, 214, 215, 216, 217, 220, 221, 223, 224, 226, 227, 228, 238, 240, 242, 254, 255, 264, and 272 and C.I. Pigment Violet 23, 29, 30, 37, 40, and 50. These can be used alone or in combination. Of these, in terms of relative inexpensiveness, good color tones, and wide range of color representation, C.I. Pigment Red 122, C.I. Pigment Red 202, C.I. Pigment Violet 19, and mixed crystals thereof are preferable. The pigment dispersion is described later.

Coloring Material

The coloring material usable other than the pigment mentioned above has no particular limit. For example, pigments and dyes are usable.

The pigment includes inorganic pigments and organic pigments.

These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvants are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254 and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289 C.I. Acid Blue 9, 45, and 249. C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably 0.1-15 percent by mass and more preferably 1-10 percent by mass in terms of enhancement of image density, fixability and discharging stability.

To disperse a pigment in the ink, for example, a hydrophilic functional group is introduced into the pigment to prepare a self-dispersible pigment, the surface of the pigment is coated with a resin, or a dispersant is used to disperse the pigment.

As a method of introducing a hydrophilic functional group into a pigment to prepare a self-dispersible pigment, it is possible to use, for example, a self-dispersion pigment, etc. in which a functional group such as a sulfone group and a carboxyl group is added to a pigment (e.g., carbon) to make it dispersible in water.

To coat the surface of the pigment with a resin, the pigment is encapsulated by microcapsules to make the pigment dispersible in water. This can be referred to as a resin-coated pigment. In this case, all the pigments to be added to ink are not necessarily coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

A coloring material may be mixed with materials such as water and an organic solvent to obtain ink. It is also possible to mix a pigment with water, a dispersant. etc., first to prepare a pigment dispersion and thereafter mix the pigment dispersion with materials such as water and organic solvent to manufacture ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density the proportion is preferably 0.1-50 percent by mass and more preferably 0.1-50 percent by mass.

It is preferable that the pigment dispersion be filtered with a filter, a centrifuge, etc. to remove coarse particles and thereafter degassed.

Resin

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The particle diameter of the solid portion in ink has no particular limit. For example, the maximum frequency in the maximum number conversion is preferably from 20 to 1,000 and more preferably from 20 to 150 nm to ameliorate the discharging stability and image quality such as image density.

The solid portion includes resin particles, particles of pigments, etc. The particle diameter can be measured by using a particle size analyzer (Nanotrac Wave-UT151, manufactured by MicrotracBEL Corp).

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application. Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical structure S-1 is introduced into the side chain of the Si site of dimethyl polysiloxane.

Chemical formula S-1

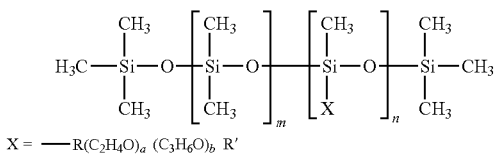

X = ——R(C$_2$H$_4$O)$_a$ (C$_3$H$_6$O)$_b$ R'

In the Chemical formula S-1 illustrated above, m, n, a, and b each, independently represent integers. In addition, R and R' each, independently represent alkyl groups and alkylene groups.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

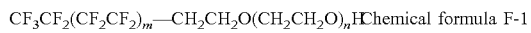

In the Chemical formula f-1, "m" is preferably 0 or an integer of from 1 to 10 and "n" is preferably 0 or an integer of from 1 to 40.

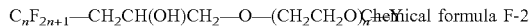

In the compound represented by the Chemical formula F-2, Y represents H or $CnF_{2n+1}$, where n represents an integer of 1-6, or $CH_2CH(OH)CH_2-CnF_{2n+}1$, where n represents an integer of 4-6, or $CpH_{2p+1}$, where p is an integer of 1-19, "a" represents an integer of 4-14.

As the fluorochemical surfactant products available on the market may be used.

Specific examples include, but are not limited to, SURFLON S-111, SURFLON S-112, SURFLON S121, SURFLON S131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M). MEGAFACE F-470, F1405, and F-474 (all manufactured by DIC CORPORATION); ZONYL TBS, FSP, FSA, FSN-100, FSN, FSO-100, FSO, FSO300 UR (all manufactured by E. I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.).

Among these, in terms of improvement on print quality, in particular coloring property and permeability, wettability, and uniform dying property on paper, FS-300 of E. I. du Pont de Nemours and Company. FT-110, FT-250, FT-251, FT-400S, FT-150, and FT-400SW of NEOS COMPANY LIMITED, POLY FOX PF-151N of OMNOVA SOLUTIONS INC. and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of enhancement of wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples are acid sulfite and sodium thiosulfate.

pH Regulator

The pH regulator has no particular limit. It is preferable to adjust the pH to 7 or higher. Specific examples thereof include, but are not limited to, amines such as diethanol amine and methanol amine.

The property of the ink is not particularly limited and can be suitably selected to suit to a particular application. For example, viscosity, surface tension, pH, etc, are preferable in the following ranges.

The viscosity of the ink at 25 degrees C. is preferably 5-30 mPa·s and more preferably 5-25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:
Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably 7-12 and more preferably 8-11 in terms of prevention of corrosion of metal materials including the ink.

Recording Medium

The recording medium is not particularly limited. Plain paper gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m² or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

Recorded Matter

The recorded matter of the present disclosure includes a recording medium and an image formed on the recording medium with the ink of the present disclosure.

An inkjet recording device and an inkjet recording method are used to record the image on the recording medium to obtain the recorded matter.

Recording Device and Recording Method

The recording device of the present disclosure includes an ink discharging device including a recording head to discharge the ink of the present disclosure to a recording medium to record information or an image on the recording medium.

The recording method of the present disclosure includes applying a stimulus to the ink of the present disclosure by an ink discharging device including a recording head and discharging the ink from the recording head to a recording medium to record information or an image on the recording medium.

The ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

In the present disclosure, the recording device and the recording method represent a device capable of discharging ink, various processing fluids, etc. to a recording medium and a method of recording an image on the recording medium using the device, respectively. The recording medium means an article to which ink or various processing fluids can be attached at least temporarily.

The recording device may further optionally include a device relating to feeding, conveying, and ejecting the recording medium and other devices referred to as a pre-processing device, a post-processing device, etc. in addition to the head portion to discharge the ink.

The recording device and the recording method may further optionally include a heater for use in the heating process and a drier for use in the drying process.

For example, the heating device mid the drying device include devices including heating and drying the print surface of a recording, medium and the opposite surface thereof. The heating device and the drying device are not particularly limited. For example, a fan heater and an infra-red healer can be used.

Heating and drying can be conducted before, in the middle of, and after printing.

In addition, the recording device and the recording method are not limited to those producing meaningful visible images such as texts and figures with the ink.

For example, the recording device and Use recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a wide device capable of printing images on a large recording medium such as A0 and a continuous printer capable of using continuous paper wound up in a roll form as recording media.

Figure 2:
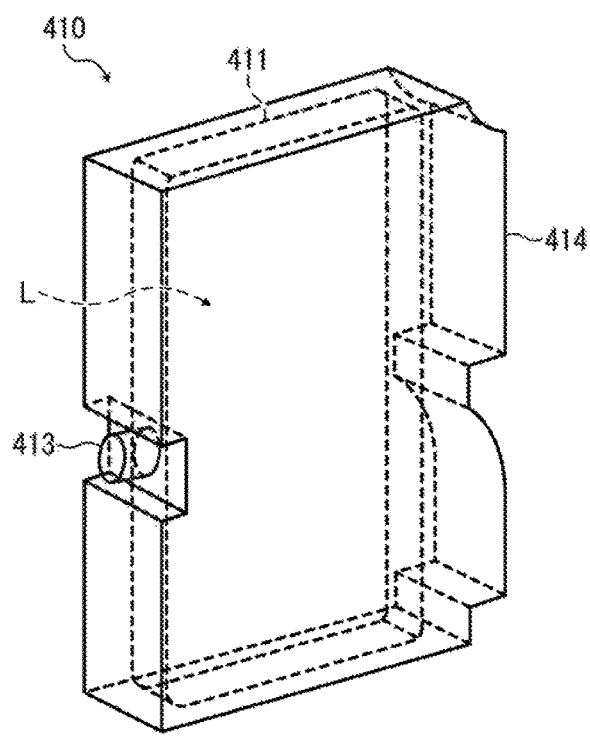
FIG. 2 is a schematic diagram illustrating an example of the ink container according to an embodiment of the present invention.

The recording device of the present disclosure is described using an example with reference to FIG. 1 and FIG. 2.

FIG. 1 is a perspective view of the recording device.

FIG. 2 is a diagram illustrating a perspective view of the main tank.

An image forming apparatus 400 as an example of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in, for example, a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation.

The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc.

The three-dimensional solid object includes an object manufactured by repeating coating with ink. In addition, the three-dimensional solid object can be manufactured by processing a structure having a substrate such as a print, medium printed with the ink as a molded processed product. The molded processed product is fabricated from printed matter or a structure having a sheet-like form, film-like form, etc. by, for example, heating drawing or punching.

The molded processed product is suitably used for articles which are molded after surface-decorating. Examples thereof are gauges or operation panels of vehicles, office machines, electric and electronic devices, cameras, etc.

Having generally described preferred embodiments of this invention, further understanding can be obtained by reference to certain specific examples which are provided herein for the purpose of illustration only and are not intended to be limiting, in the descriptions in the following examples, the numbers represent weight ratios in parts, unless otherwise specified.

EXAMPLES

The present invention is described in detail with reference to Examples but not limited to the following Examples.

Mass Spectrometry

A matrix assisted laser desorption ionization time of flight mass spectrometer (MALDI-TOFMS-MS) (autoflex III, manufactured by Broker Daltonics K.K.) was used for analysis under the following measuring conditions.

Measuring Conditions
At Positive Ion Measuring
Ion Source 1: 19.00 kV
Ion Source 2: 16.65 kV
Lens: 8.20 kV
Reflector 1: 21.00 kV
Reflector 2: 9.70 kV
Laser: Smart beam 2 (wavelength: 355 nm, 532 nm, 1064 nm, 803-813 nm)
Matrix: None
Detection mode: Reflector Detection ion: Positive
Calibration: CsI3
At Negative Ion Measuring
Ion Source 1: 19.00 kV
Ion Source 2: 16.65 kV
Lens: 8.50 kV
Reflector 1: 21.00 kV
Reflector 2: 9.70 kV
Laser: Smart beam 2 (wavelength: 355 nm, 532 nm, 1064 nm, 803-813 nm)
Matrix: None
Detection mode: Reflector
Detection ion: Negative
Calibration: CsI3

Mass Average Molecular Mass of Copolymer

The mass average molecular mass was measured according to GPC method using a column constant temperature tank (CTO-20A, manufactured by Shimadzu Corporation), a detector (RID-10A, manufactured by SHIMADZU CORPORATION), an eluent flowing path pump (LC-20AD, manufactured by SHIMADZU Corporation), a deflating equipment (Degasser DGU-20A, manufactured by SHIMADZU COPORATION), and an autosampler (SIL-20A, manufactured by SHIMADZU COPORATION). The column used was formed by connecting an aqueous SEC column TSKgel G3000 PWXL (elimination limit molecule quantity: $2 \times 10^5$), TSKgel G5000 PWXL (elimination limit molecule quantity; $2.5 \times 10^6$), and TSKgel G6000 PWXL (elimination limit molecule quantity $5 \times 10^7$) (all manufactured by TOSOH CORPORATION). A sample was adjusted to be 2 g/100 ml by an eluent and used for measurement. An aqueous solution adjusted to have 0.5 mol/L of each of acetic acid and sodium acetate were used as the eluent. The column temperature was 40 degrees C. and the flow speed was 1.0 mL/min.

9 kinds of polyethyleneglyocols having molecular masses of 1,065, 5,050, 24,000, 50,000, 107,000, 140,000, 250,000, 540,000, and 920,000 were used as the standard sample to obtain a calibration curve. Based on the calibration curve, the mass average molecular mass of the copolymer was obtained.

Synthesis Example 1 of Quinacridone Mixture 40 g of sulfuric acid was charged in a flask (four-necked, 100 mL) and cooled in an ice water bath. 5 g of quinacridone (manufactured by Tokyo Chemical Industry Co. Ltd.) was added little by little in 30 minutes in order that the temperature did not surpass 5 degrees C. Thereafter, the liquid was stirred for 30 minutes while being cooled in the ice-water bath.

Next, 4 g of 2-chloro-N-(hydroxymethyl)acetoamide (manufactured by Sigma-Aldrich Japan K.K.) was added little by little in 30 minutes in order that the temperature did not surpass 5 degrees C. Thereafter, the liquid was stirred for 60 minutes while being cooled in the ice-water bath, followed by 24-hour stirring at room temperature. Subsequent to the stirring, the reaction solution was added little by little in 400 g of ice water to obtain a precipitate of red-purple color while being stirred. The precipitate was filtrated by a glass filter. The filtrate was rinsed with 200 g of deionized water three times and dried at 60 degrees C. with a reduced pressure to obtain 6.7 g of chloroacetoamide methylated quinacridone.

Figure 3:
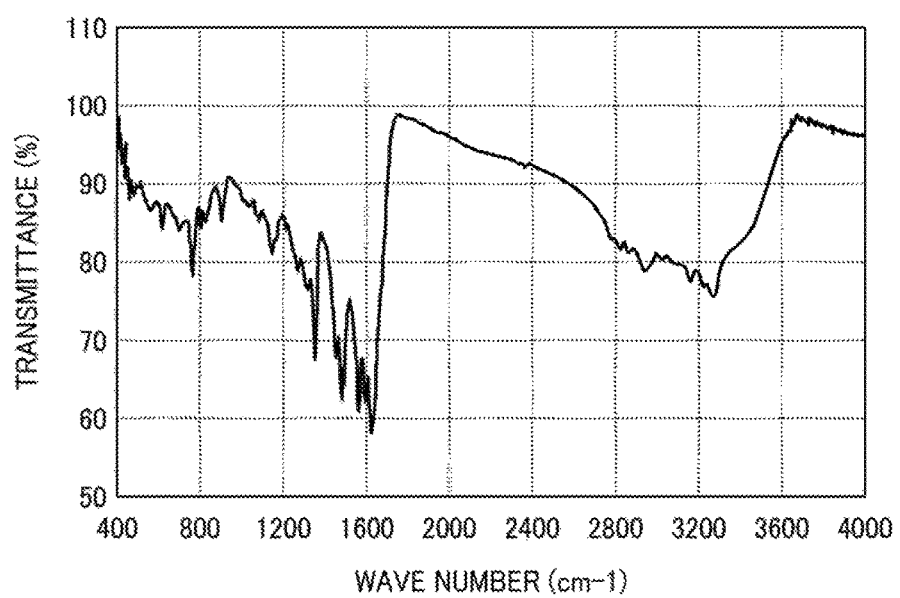
FIG. 3 is a diagram illustrating the measuring result of the infra-red absorption spectrum graph (KBr tablet method) of the mixture specified in Examples described later.

10 g of 3-(dimethylamino)-1-propylamine was charged in a flask (three-necked, 50 mL) and cooled in an ice water bath. 3.5 g of the thus-obtained chloroacetoamide methylated quinacridone was added little by little in 30 minutes in order that the temperature did not surpass 5 degrees C. Thereafter, the liquid was stirred for op minutes while being cooled in the ice-water bath, followed by 24-hour stirring at room temperature. Subsequent to the stirring, the reaction solution was added little by little in 200 g of ice water to obtain a precipitate of red-purple color. The precipitate was filtrated by a glass filter. The filtrate was rinsed with 100 g of deionized water three times and dried at 60 degrees C. with a reduced pressure to obtain 3.2 g of quinacridone mixture of red-purple color. The infra-red absorption spectrum graph (KBr tablet method) of this mixture is shown in FIG. 3.

In addition, the thus-obtained quinacridone mixture was subject to mass spectrometry. Molecule ion peaks of $[M+H]^+$ were observed at 484.6 and 655.8 at positive ion measuring and a molecule ion peak of $[M-H]^-$ was observed at 482.6 at negative ion measuring. That is, the quinacridone compounds represented by the following Chemical structure 1 and the Chemical structure 2 were found to be mixed.

The quinacridone mixture represented by the following Chemical structure 1 and the Chemical structure 2 are mixed in which $R^1$ to $R^4$ are hydrogen, $R^5$ and $R^6$ are methyl groups, $R^7$ is a propylene group, and m is 1 and 2 in the Chemical formula 1.

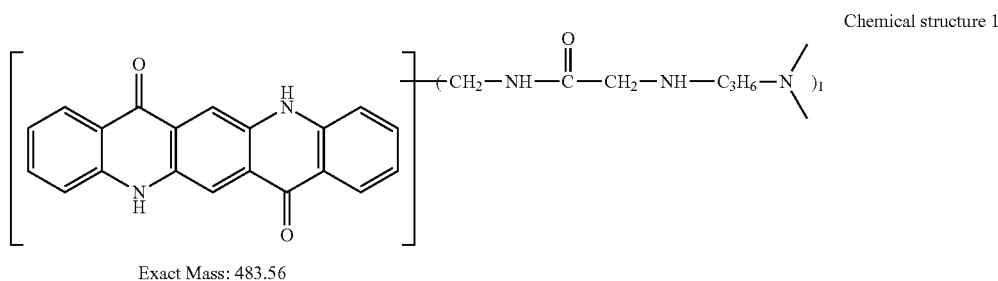

Chemical structure 1

Exact Mass: 483.56

Chemical structure 2

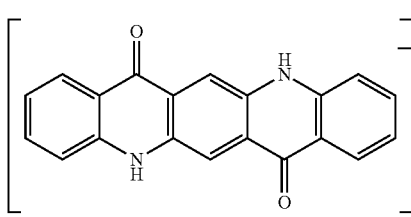

Exact Mass: 654.80

Example 1

Synthesis of Monomer 62.0 g (525 mmol) of 1,6-hexanediol (manufactured by Tokyo Chemical Industry Co., Ltd.) was dissolved in 700 mL of methylene chloride (manufactured by Tokyo Chemical Industry Co., Ltd ) and 20.7 g (262 mmol) of pyridine was further added.

To this solution, a solution in which 50.0 g (262 mmol) of 2-naphthalene carbonyl chloride (manufacture by Tokyo Chemical Industry Co., Ltd.) was dissolved in 100 ml of dichloromethane (manufactured by Tokyo Chemical Industry Co., Ltd.) was dripped in two hours followed by stirring at room temperature for six hours.

The thus-obtained reaction solution was rinsed with water and thereafter the organic phase was isolated followed by drying with magnesium sulfate and the solvent was distilled away.

The residual was refined by silica gel column chromatography with a solvent mixture of a methylene chloride and methanol with a volume ratio of 98:2 serving as an eluent to obtain 52.5 g of 2-naphthoic acid-2-hydroxyhexyl ester.

Next, 42.1 g (155 mmol) of 2-naphthoic acid-2-hydroxyhexyl ester was dissolved in 80 mL of dried methylethyl-ketone followed by heating to 60 degrees C. To this solution, a solution in which 24.0 g (155 mmol) of 2-methacryloyloxy ethylisocyanate (Karenz MOI, manufactured by SHOWA DENKO K.K.) was dissolved in 20 mL of dried methylke-tone was dripped in one hour while being stirred followed by stirring at 70 degrees C. for 12 hours. After being cooled down to room temperature, the solvent was distilled away.

The residual was refined by silica gel column chromatography with a solvent mixture of a methylene chloride and methanol with a volume ratio of 99:1 serving as an eluent to obtain 57.0 g of the following monomer M-1.

Monomer M-1

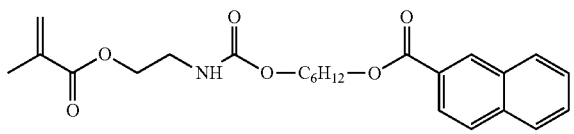

Synthesis of Copolymer

Thereafter, 11.37 g (40 mmol) of BLEMMER®PE-200 (manufactured by NOF CORPORATION) and 25.65 g (60 mmol) of the monomer M-1 were dissolved in 130 mL of dried methylethyl ketone to prepare a monomer solution. The monomer solution was divided into two with a mass ratio of 10 percent to 90 percent. Thereafter, the 10 percent of the monomer solution was heated to 75 degrees C. in an argon atmosphere. 0.82 g (5 mmol) of 2,2'-azoiso(butyloni-trile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The thus-obtained precipitated copolymer was dissolved in tetrahydrofuran (THF) followed by evaporation and drying with a reduced pressure to obtain 33.35 g of a copolymer (mass average molecular mass Mw: 15,200, number average molecular mass Mn: 6,100).

Manufacturing of Pigment Dispersion

An aqueous solution in which the concentration of the copolymer was 20 percent was prepared 20.0 g of this copolymer aqueous solution, 0.5 g of quinacridone mixture manufactured in the Synthesis Example, 9.5 g of magenta pigment (C.I. Pigment Red 122, Ink Jet Magenta E 02, manufactured b Clariant), and 29.0 g of deionized water were mixed and stirred for 12 hours. The thus-obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain a pigment dispersion (solid portion concentration: 20 percent by mass).

Preparation of Ink 30.0 g of the pigment dispersion, 10.0 g of 1,3-butanediol, 10.0 g of glycerin, 10.0 g of 3-methoxy-N,N-diemthyl propionamide, 1.0 g of fluorochemical surfactant (ZO-NYL™ FS-300, solid portion: 40 percent by mass, manufactured by E. I. du Pont de Nemours and Company), and 39.0 g of deionized water were mixed followed by stirring for one hour and filtration by a membrane filter having an opening diameter of 1.2 micro meter to obtain an ink of Example 1.

Example 2

A pigment dispersion and an ink were manufactured in the same manner as in Example 1 except that the magenta pigment used in the manufacturing of the pigment dispersion of Example 1 was changed to C.I. Pigment Violet 19 (Hostaperm Red E5B 02, manufactured by Clariant).

Example 3

A pigment dispersion and an ink were manufactured in the same manner as in Example 1 except that the magenta pigment used in the manufacturing of the pigment dispersion of Example 1 was changed to the following.
C.I. Pigment Red 122 (Ink Jet magenta E 02, manufactured by Clariant); 5 g
C.I. Pigment Violet 19 (Hostaperm Red E5B 02, manufactured by Clariant): 4.5 g

Example 4

A pigment dispersion and an ink were manufactured in the same manner as in Example 1 except that the magenta pigment used in the manufacturing of the pigment dispersion of Example 1 was changed to a mixed crystal of C.I. Pigment Red 122-C.I. Pigment Violet 19 and Ink Jet Magenta E7B VP 3958, manufactured by Clariant).

Example 5

A pigment dispersion and an ink were manufactured in the same manner as in Example 1 except that the magenta pigment used in the manufacturing of the pigment dispersion of Example 1 was changed to a mixed crystal of C.I. Pigment Red 202/C.I. Pigment Violet 19 and Cinquasia Magenta D 4500 J (manufactured by BASF).

Example 6

A pigment dispersion and an ink were manufactured in the same manner as in Example 1 except that the BLEMMER® PE-200 used in the manufacturing of the pigment dispersion of Example 1 was changed to the following.
BLEMMER® PE-350 (manufactured by NOF CORPORATION): 17.54 g (40 mmol)

Example 7

A pigment dispersion and an ink were manufactured in the same manner as in Example 1 except that BLEMMER® PE-200 for use in the preparation of the copolymer of Example 1 was changed to the following.
BLEMMER® PME-1000 (manufactured by NOF CORPORATION): 44.53 g (40 mmol)

Example 8

A pigment dispersion and an ink were manufactured in the same manner as in Example 1 except that the synthesis of the copolymer and the manufacturing of the pigment dispersion of Example 1 were changed to the following.
Synthesis of Copolymer
38.97 g (35 mmol) of BLEMMER® PME-1000 (manufactured by NOF CORPORATION), 25.65 g (60 mmol) of the monomer M-1, and 0.36 g (5 mmol) of acrylic acid were dissolved in 130 mL of dried methylethyl ketone to prepare a monomer solution.
The monomer solution was divided into two with a mass ratio of 10 percent to 90 percent. Thereafter, the 10 percent of the monomer solution was heated to 75 degrees C. in an argon atmosphere. 0.82 g (5 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The thus-obtained precipitated copolymer was dissolved in THF followed by evaporation and drying with a reduced pressure to obtain 59.64 g of a copolymer (mass average molecular mass Mw: 15,300, number average molecular mass Mn: 6,100).
Manufacturing of Pigment Dispersion
The obtained copolymer was dissolved in tetraethyl ammonium hydroxide solution in such a manner that the concentration of the copolymer was 20 percent and the pH thereof was 8.0 to prepare an aqueous solution of the copolymer. 20.0 g of this copolymer aqueous solution, 0.5 g of quinacridone mixture manufactured in the Synthesis Example, 9.5 g of magenta pigment (C.I. Pigment Red 122, Ink Jet Magenta E 02, manufactured by Clariant), and 29.0 g of deionized water were mixed and stirred for 12 hours.
The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain a pigment dispersion (solid portion concentration: 20 percent by mass).

Example 9

A pigment dispersion and an ink were manufactured in the same manner as in Example 8 except that acrylic acid for use in the synthesis of the copolymer was changed to the following.
Mass average molecular mass Mw of the thus-obtained copolymer: 14,700
Number average molecular mass Mn of the thus-obtained copolymer: 5,900
Methacrylic acid (manufactured by TOKYO CHEMICAL INDUSTRY CO., LTD.): 0.43 g (5 mmol)

Example 10

A pigment dispersion and an ink were manufactured in the same manner as in Example 1 except that 1,6-hexanediol used in the synthesis of the monomer of Example 1 was changed to ethyleneglycol (manufactured by TOKYO CHEMICAL INDUSTRY CO., LTD.) to synthesize the following monomer M-2 and a copolymer (mass average molecular mass Mw: 15,000, number average molecular mass Mn: 6,000) was synthesized using 22.28 g (60 mmol) of the monomer M-2 instead of the monomer M-1.

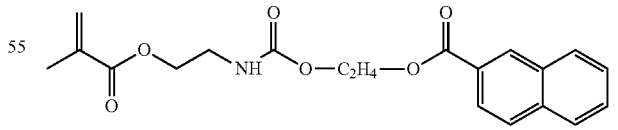

M-2

Example 11

A pigment dispersion and an ink were manufactured in the same manner as in Example 1 except that 1,6-hexanediol used in the synthesis of the monomer of Example 1 was changed to 1,1,2-dodecane diol (manufactured by TOKYO CHEMICAL INDUSTRY CO., LTD.) to synthesize the following monomer M-3 and a copolymer (mass average molecular mass Mw: 14,900, number average molecular mass Mn: 6,000) was synthesized using 30.70 g (60 mmol) of the monomer M3 instead of the monomer M-1.

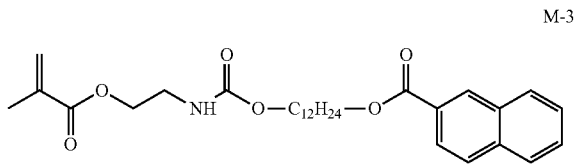

M-3

Example 12

A pigment dispersion and an ink were manufactured in the same manner as in Example 1 except that 1,6-hexanediol used in the synthesis of the monomer of Example 1 was changed to 1,1,6-hexadecane diol (manufactured by TOKYO CHEMICAL INDUSTRY CO., LTD.) to synthesize the following monomer M-4 and a copolymer (mass average molecular mass Mw: 15,400, number average molecular mass Mn: 6,200) was synthesized using 34.07 g (60 mmol) of the monomer M-4 instead of the monomer M-1.

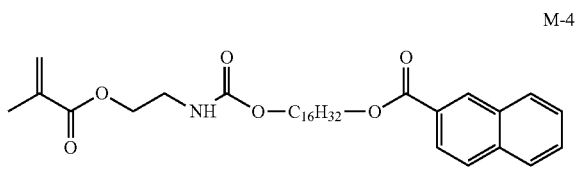

M-4

Example 13

A pigment dispersion and an ink were manufactured in the same manner as in Example 1 except that the content of the dried methylethyl ketone used in the synthesis of the copolymer of Example 1 was changed to 600 mL to synthesize a copolymer (mass average molecular mass Mw: 5,100, number average molecular mass Mn: 2,000).

Example 14

A pigment dispersion and an ink were manufactured in the same manner as in Example 1 except that the content of the dried methylethyl ketone used in the synthesis of the copolymer of Example 1 was changed to 500 mL to synthesize a copolymer (mass average molecular mass Mw: 7,600, number average molecular mass Mn: 3,000).

Example 15

A pigment dispersion and an ink were manufactured in the same manner as in Example 1 except that the content, of the dried methylethyl ketone used in the synthesis of the copolymer of Example 1 was changed to mL to synthesize a copolymer (mass average molecular mass Mw: 25,600, number average molecular mass Mn: 10,200).

Example 16

A pigment dispersion and an ink were manufactured in the same manner as in Example 1 except that the content of the dried methylethyl ketone used in the synthesis of the copolymer of Example 1 was changed to 40 mL to synthesize a copolymer (mass average molecular mass Mw: 39,200, number average molecular mass Mn: 15,900).

Example 17

A pigment dispersion and art ink were manufactured in the same manner as in Example 1 except that she content of the dried methylethyl ketone used in the synthesis of the copolymer of Example 1 was changed to 30 mL to synthesize a copolymer (mass average molecular mass Mw: 51,800, number average molecular mass Mn: 20,700).

Example 18

Synthesis of Monomer 40.0 g (235 mmol) of 2-phenyl phenol (manufactured by TOKYO CHEMICAL INDUSTRY CO., LTD.) and 51.06 g (282 mmol) of 6-bromo-1-hexanol (manufactured by TOKYO CHEMICAL INDUSTRY CO., LTD.) were dissolved in 609 mL of methylethyl ketone. 97.4 g of calcium carbonate was added to this solution followed by heating and reflux for 8 hours.

Subsequent to cooling down to room temperature, the resultant was filtrated and the filtrate was condensed at a reduced pressure. The thus-obtained light brown liquid was dissolved in methylene chloride and the organic layer was rinsed with water using a separatory funnel. Subsequent to drying with magnesium sulfate, the solvent was distiled away. The thus-obtained remnant was refined by silica gel column chromatography using methylene chloride as an eluent to obtain 105.3 g of 6-(2phenylphenoxy)hexane-1-ol.

Next, 14.10 g (52mmol) of 6-(2-phenylphenoxy)hexane-1-ol was dissolved in 50 mL of dried methylethyl ketone and the solution was heated to 40 degrees C. and stirred. To this solution, 8.09 g (52 mmol) of 2-methacryloyloxyethyl isocyanate (Karenz MOI, manufactured by SHOWA DENKO K.K.) was dripped in 30 minutes followed by stirring at 70 degrees C. for 12 hours. Subsequent to cooling down to room temperature, the residual obtained by distilling away the solvent was refined by silica gel column chromatography with a solvent mixture of methylene chloride and methanol with a volume ratio of 98:2 serving as an eluent to obtain 18.88 g of the following monomer M-11.

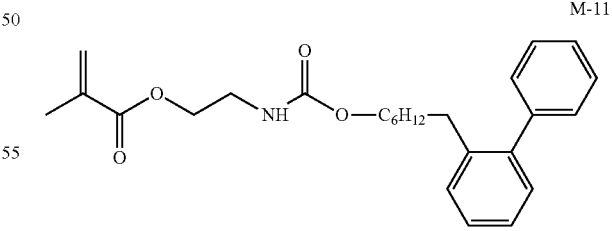

M-11

Synthesis of Copolymer 11.37 g (40 mmol) or BLEMMER® PE-200 (manufactured by NOF CORPORATION) and 25.53 g (60 mmol) of the monomer M-11 were dissolved in 130 mL of dried methylethyl ketone to prepare a monomer solution.

The monomer solution was divided into two with a mass ratio of 10 percent to 90 percent. Thereafter, the 10 percent of the monomer solution was heated to 75 degrees C. in an argon atmosphere. 0.82 g (5 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The thus-obtained precipitated copolymer was dissolved in THF followed by evaporation and drying with a reduced pressure to obtain 36.65 g of a copolymer (mass average molecular mass Mw: 15,000, number average molecular mass Mm 6,000).

Manufacturing of Pigment Dispersion

An aqueous solution in which the concentration of the copolymer was 20 percent was prepared. 20.0 g of this copolymer aqueous solution, 0.5 g of quinacridone mixture manufactured in the Synthesis Example, 9.5 g of magenta pigment (C.I. Pigment Red 122, Ink Jet Magenta E 02, manufactured by Clariant), and 29.0 g of deionized water were mixed and stirred for 12 hours. The thus-obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micrometer. Thereafter, deionized water was added for adjustment to obtain a pigment dispersion (solid portion concentration: 20 percent by mass).

Preparation of Ink 30.0 g of the pigment dispersion, 10.0 g of 1,3-butanediol, 10.0 g of glycerin, 10.0 g of 3-methoxy-N,N-diemthyl propionamide, 1.0 g of fluorochemical surfactant (ZONYL™ FS-300, solid portion: 40 percent by mass, manufactured by E. I. du Pont de Nemours and Company), and 39.0 g of deionized water were mixed followed by stirring for one hour and filtration by a membrane filter having an opening diameter of 1.2 micro meter to obtain an link of Example 18.

Example 19

A pigment dispersion and an ink were manufactured in the same manner as in Example 18 except that the magenta pigment used in the manufacturing of the pigment dispersion of Example 18 was changed to C.I. Pigment Violet 19 (Hostaperm Red E5B 02, manufactured by Clariant).

Example 20

A pigment dispersion and an ink were manufactured in the same manner as in Example 18 except that the magenta pigment used in the manufacturing of the pigment dispersion of Example 18 was changed to the following.
C.I. Pigment Red 122 (Ink Jet Magenta E 02, manufactured by Clariant): 5 g
C.I. Pigment Violet 10 (Hostaperm Red E5B 02, manufactured by Clariant): 4.5 g Example 21

A pigment dispersion and an ink were manufactured in the same manner as in Example 18 except that the magenta pigment used in the manufacturing of the pigment dispersion of Example 18 was changed to a mixed crystal of C.I. Pigment Red 122/C.I. Pigment Violet 19 and Ink jet Magenta E7B VP 3958, Hostaperm Red E5B 3958 (manufactured by Clariant).

Example 22

A pigment dispersion and an ink were manufactured in the same manner as in Example 18 except that the magenta pigment used in the manufacturing of the pigment dispersion of Example 18 was changed to a mixed crystal of C.I. Pigment Red 202/C.I. Pigment Violet 19 and Cinquasta Magenta D 4500 J (manufactured by BASF).

Example 23

A pigment dispersion and an ink were manufactured in the same manner as in Example 18 except, that the BLEMMER® PE-200 used in the manufacturing of the pigment dispersion of Example 18 was changed to the following.
BLEMMER® PE-350 (manufactured by NOF CORPORATION): 17.54 g (40 mmol)

Example 24

A pigment dispersion and an ink were manufactured in the same manner as in Example 18 except that the BLEMMER® PE-200 used in the manufacturing of the pigment dispersion of Example 18 was changed to the following.
BLEMMER® PME-1000 (manufactured by NOF CORPORATION): 44.53 g (40 mmol)

Example 25

A pigment dispersion and an ink were manufactured in the same manner as in Example 18 except that the synthesis of the copolymer and the manufacturing of the pigment dispersion of Example 18 were changed to the following.
Synthesis of Copolymer 38.97 g (35 mmol) of BLEMMER® PME-1000 (manufactured by NOF CORPORATION), 25.53 g (60 mmol) of the monomer M-11, and 0.36 g (5 mmol) of acrylic acid were dissolved in 130 mL of dried methylethyl ketone to prepare a monomer solution. The monomer solution was divided into two with a mass ratio of 10 percent to 90 percent. Thereafter, the 10 percent of the monomer solution was heated to 75 degrees C. in an argon atmosphere. 0.82 g (5 mmol) of 2,2'-azoiso(butylonitrile) (manufactured by Tokyo Chemical Industry Co., Ltd.) was dissolved in the 90 percent of the monomer solution, which was thereafter dripped to the heated monomer solution, in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The thus-obtained precipitated copolymer was dissolved in THF-followed by evaporation and drying with a reduced pressure to obtain 61.55 g of a copolymer (mass average molecular mass Mw: 15,100, number average molecular mass Mn: 6,000).

Manufacturing of Pigment Dispersion

The obtained copolymer was dissolved in tetraethyl ammonium hydroxide solution in such a manner that the concentration of the copolymer was 20 percent and the pH thereof was 8.0 to prepare an aqueous solution of the copolymer. 20.0 g of this copolymer aqueous solution. 0.5 g of quinacridone mixture manufactured in the Synthesis Example, 9.5 g of magenta pigment (C.I. Pigment Red 122, Ink Jet Magenta E 0.2, manufactured by Clariant), and 29.0 g of deionized water were mixed and stirred for 12 hours. The thus-obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain a pigment dispersion (solid portion concentration: 20 percent by mass).

Example 26

A pigment dispersion and an ink were manufactured in the same manner as in Example 25 except that acrylic acid for use in the synthesis of the copolymer was changed to the following.
Mass average molecular mass Mw of the thus-obtained copolymer: 14,800
Number average molecular mass Mn of the thus-obtained copolymer: 5,000
Methacrylic acid (manufactured by TOKYO CHEMICAL INDUSTRY CO., LTD.): 0.43 g (5 mmol)

Example 27

A pigment dispersion and an ink were manufactured in the same manner as in Example 18 except that the synthesis of the monomer of Example 18 was changed to the following to synthesize the monomer M-12 and a copolymer (mass average molecular mass Mw: 15,000, number average molecular mass Mn: 6,000) was synthesized using 19.52 g (60 mmol) of the monomer M-12 instead of the monomer M11.

Synthesis of Monomer 12.00 g (86 mmol) of 4-phenylphenol was dissolved in 50 mL of dried methylethyl ketone and the solution was heated to 40 degrees C. and stirred.

To this solution, 12.68 g (74 mmol) of 2-methacryloyloxyethyl isocyanate (Karenz MOI, manufactured by SHOWA DENKO K.K.) was dripped in 30 minutes followed by stirring at 70 degrees C. for 12 hours.

After being cooled down to room temperature, the solvent was distilled away.

The residual obtained by distilling away the solvent was refined by silica gel column chromatography with a solvent mixture of methylene chloride and methanol with a volume ratio of 98:2 serving as an eluent to obtain 20.6 g of the following monomer M-12.

M-12

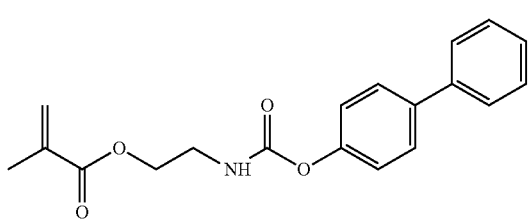

Example 28

A pigment dispersion and an ink were manufactured in the same manner as in Example 18 except that 6-bromo-1-hexanol used in the synthesis of the monomer of Example 18 was changed to 2-bromoethanol (manufactured by TOKYO CHEMICAL INDUSTRY CO., LTD.) to synthesize the following monomer M-13 and a copolymer (mass average molecular mass Mw. 15,000, number average molecular mass Mn: 6.000) was synthesized using 22.16 g (60 mmol) of the monomer M-13 instead of the monomer M-11.

M-13

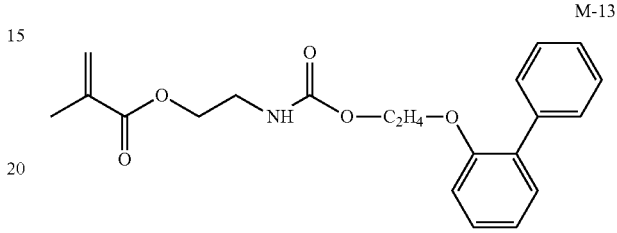

Example 29

A pigment dispersion and an ink were manufactured in the same manner as in Example 18 except that 6-bromo-1-hexanol used in the synthesis of the monomer of Example 18 was changed to 2-bromoethanol (manufactured by TOKYO CHEMICAL INDUSTRY CO., LTD.) to synthesize the following monomer M-14 and a copolymer (mass average molecular mass Mw: 55,300, number average molecular mass Mn: 6,200) was synthesized using 33.95 g (60 mmol) of the monomer M-14 instead of the monomer M-11.

M-14

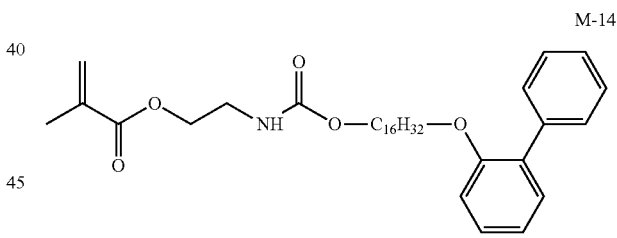

Example 30

A pigment dispersion and an ink were manufactured in the same manner as in Example 18 except that the content of the dried methylethyl ketone used in the synthesis of the copolymer of Example 18 was changed to 600 mL to synthesize a copolymer (mass average molecular mass Mw: 5,200, number average molecular mass Mn: 2,100).

Example 31

A pigment dispersion and an ink were manufactured in the same manner as in Example 18 except that the content of the dried methylethyl ketone used in the synthesis of the copolymer of Example 18 was changed to 500 mL to synthesize a copolymer (mass average molecular mass Mw: 7,700, number average molecular mass Mn: 3,100).

Example 32

A pigment dispersion and an ink were manufactured in the same manner as in Example 18 except that the content of the dried methylethyl ketone used in the synthesis of the copolymer of Example 18 was changed to 70 mL to synthesize a copolymer (mass average molecular mass Mw: 25,000, number average molecular mass Mn: 10,000).

Example 33

A pigment dispersion and an ink were manufactured in the same manner as in Example 18 except that the content of the dried methylethyl ketone used in the synthesis of the copolymer of Example 18 was changed to 40 mL to synthesize a copolymer (mass average molecular mass Mw: 39,000, number average molecular mass Mn: 15,800).

Example 34

A pigment dispersion and an ink were manufactured in the same manner as in Example 18 except that the content of the dried methylethyl ketone used in the synthesis of the copolymer of Example 18 was changed to 30 mL to synthesize a copolymer (mass average molecular mass Mw: 50,600, number average molecular mass Mn: 20,200).

Comparative Example 1

Synthesis Example of Quinacridone Compound of Comparative Example

According to the method of Synthesis Example 1 of Unexamined Japanese Patent Application Publication No. 2007-63407, the quinacridone compound represented by the following Chemical structure 3 was synthesized and used instead of the qinacridone mixture for use in the manufacturing of the pigment dispersion of Example 1.

Chemical structure 3

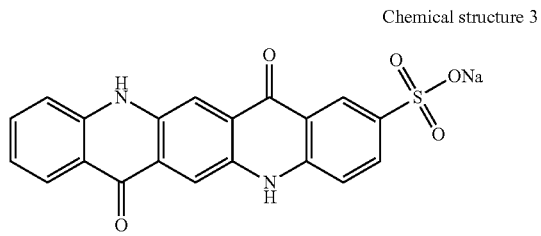

Comparative Example 2

A pigment dispersion and an ink were manufactured in the same manner as in Example 1 except that no quinacridone mixture for use in the manufacturing of the pigment dispersion of Example 1 was added.

Comparative Example 3

A pigment dispersion and an ink were manufactured in the same manner as in Example 1 except that no copolymer aqueous solution in the manufacturing of the pigment dispersion of Example 1 was added.

Comparative Example 4

A pigment dispersion and an ink were manufactured in the same manner as in Example 1 except that the monomer represented by the following Chemical structure 4 was used to synthesize a copolymer instead of the monomer M-1 for use in the synthesis of the copolymer of Example 1 and 6.36 g of the copolymer (mass average molecular mass Mw: 14,900, number average molecular mass Mn: 6,000) was used.

Chemical structure 4

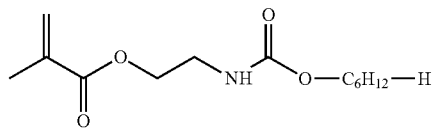

Comparative Example 5

Synthesis Example of Quinacridone Compound of Comparative Example

According to the method of Synthesis Example 1 of Unexamined Japanese Patent Application Publication No. 2007-63407, the quinacridone compound represented by the following Chemical structure 3 was synthesized and used instead of the quinacridone mixture for use in the manufacturing of the pigment dispersion of Example 18.

Comparative Example 6

A pigment dispersion and an ink were manufactured in the same manner as in Example 18 except that no quinacridone mixture for use in the manufacturing of the pigment dispersion of Example 18 was added.

Example 35

A pigment dispersion and an ink were manufactured in the same manner as in Example 1 except that the quinacridone mixture for use in Example 1 was changed to the following.

Synthesis Example 2 of Quinacridone Mixture 40 g of sulfuric acid was charged in a flask (four-necked, 100 mL) and cooled in an ice water bath. 5 g of 2,9-dimethylquinacridone (manufactured by Tokyo Chemical Industry Co. Ltd.) was added little by little in 30 minutes in order that the temperature did not surpass 5 degrees C. Thereafter, the liquid was stirred for 30 minutes while being cooled in the ice-water bath. Next, 4 g of 2-chloro-N-(hydroxymethyl)acetomide (manufactured by Sigma-Aldrich Japan K.K.) was added little by little in 30 minutes in order that the temperature did not surpass 5 degrees C. Thereafter, the liquid was stirred for 60 minutes while being cooled in the ice-water bath, followed by 24-hour stirring at room temperature. Subsequent to the stirring, the reaction solution was added little by little in 400 g of ice water to obtain a precipitate of red-purple color. The precipitate was filtrated by a glass filter. The filtrate was rinsed with 200 g of deionized water three times and dried at 60 degrees C. with a reduced pressure to obtain 6.6 g of chloroacetoamide methylated quinacridone.

10 g of 3-(dimethylamino)-1-propylamine was charged in a flask (three-necked, 50 mL) and cooled in an ice water bath. 3.5 g of the thus-obtained chloroacetoamide methylated quinacridone was added little by little in 30 minutes in order that the temperature did not surpass 5 degrees C. Thereafter, the liquid was stirred for 60 minutes while being cooled in the ice-water bath, followed by 24-hour stirring at room temperature. Subsequent to the stirring, the reaction solution was added little by little in 200 g of ice water to obtain a precipitate of red-purple color. The precipitate was filtrated by a glass filter. The filtrate was rinsed with 100 g of deionized water three times and dried at 60 degrees C. with a reduced pressure to obtain 3.2 g of quinacridone mixture of red-purple color. The same infra red absorption spectrum was observed for the quinacridone mixture as the quinacridone mixture for use in Example 1.

In addition, the thus-obtained quinacridone mixture was subjected to mass spectrometry. Molecule ion peaks of [M+H]$^+$ were observed at 512.6 and 683.9 at positive ion measuring and a molecule ion peak of [M−H]$^-$ was observed at 510.6 at negative ion measuring. That is, the quinacridone compounds represented by the following Chemical structure 5 and the Chemical structure 6 were found to be mixed.

The quinacridone mixture represented by the following Chemical structure 5 and the Chemical structure 6 are mixed in such a manner that R$^1$ to R$^4$ are hydrogen, R$^2$ and R$^3$ are methyl groups, R$^7$ is a propylene group, and m is 1 and 2 in the Chemical formula 1.

room temperature. Subsequent to the stirring, the reaction solution was added little by little in 400 g of ice water to obtain a precipitate of red-purple color. The precipitate was filtrated by a glass filter. The filtrate was rinsed with 200 g of deionized water three times and dried at 60 degrees C. with a reduced pressure to obtain 6.7 g of chloroacetoamide methylated quinacridone.

10 g of 3-(dimethylamino)-1-propylamine was charged in a flask three-necked, 50 mL) and cooled in an ice water bath. 3.5 g of the thus-obtained chloroacetoamide methylated quinacridone was added little by little in 30 minutes in order that the temperature did not surpass 5 degrees C. Thereafter, the liquid was stirred tor 60 minutes while being cooled in the ice-water bath, followed by 24-hour stirring at room temperature. Subsequent to the stirring, the reaction solution was added little by little in 200 g of ice water to obtain a precipitate of red-purple color. The precipitate was filtrated by a glass filter. The filtrate was rinsed with 100 g of

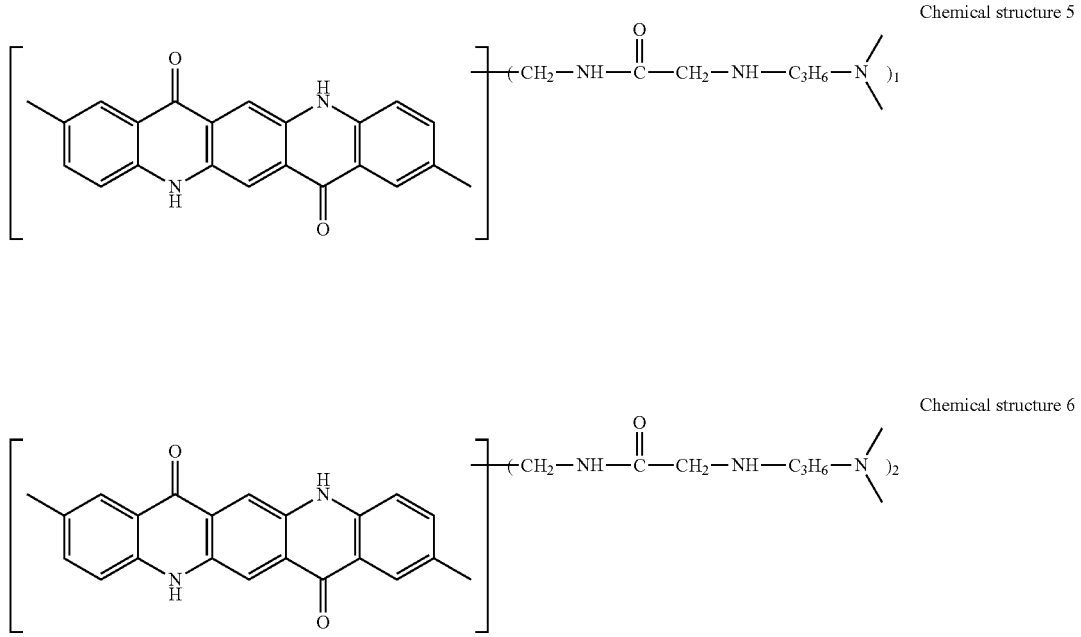

Chemical structure 5

Chemical structure 6

Example 36

A pigment dispersion and an ink were manufactured in the same manner as in Example 1 except that, the quinacridone mixture for use in Example 1 was changed to the following.

Synthesis Example 3 of Quinacridone Mixture 40 g of sulfuric acid was charged in a flask (four-necked, 100 mL) and cooled in an toe water hath, 5 g of 2.9-dichloroquinacridone (manufactured by Tokyo Chemical Industry Co. Ltd.) was added little by little in 30 minutes in order that the temperature did not surpass 5 degrees C. Thereafter, the liquid was stirred for 30 minutes while being cooled in the ice-water bath. Next, 4 g of 2-chloro-N-(hydroxymethyl)acetoamide (manufactured by Sigma-Aldrich Japan K.K.) was added little by little in 30 minutes in order that the temperature did not surpass 5 degrees C. Thereafter, the liquid was stirred for 60 minutes while being cooled in the ice-water bath, followed by 24-hour stirring at deionized water three times and dried at 60 degrees C. with a reduced pressure to obtain 3.3 g of quinacridone mixture of red-purple color. The same infra red absorption spectrum was observed for the quinacridone mixture as the quinacridone mixture for use in Example 1.

In addition, the thus-obtained quinacridone mixture was subjected to mass spectrometry. Molecule ion peaks of [M+H]$^+$ were observed at 552.5 and 723.7 at positive ion measuring and a molecule ion peak of [M−H]$^-$ was observed at 551.5 at negative ion measuring. That is, the quinacridone compounds represented by the following Chemical structure 7 and the Chemical structure 8 were found to be mixed.

The quinacridone mixture represented by the following Chemical structure 7 and the Chemical structure 8 are mixed in such a manner that R$^1$ and R$^4$ are chlorine, R$^2$ and R$^3$ are hydrogen, R$^5$ and R$^6$ are methyl groups, R$^7$ is a propylene group, and m is 1 and 2 in the Chemical formula 1.

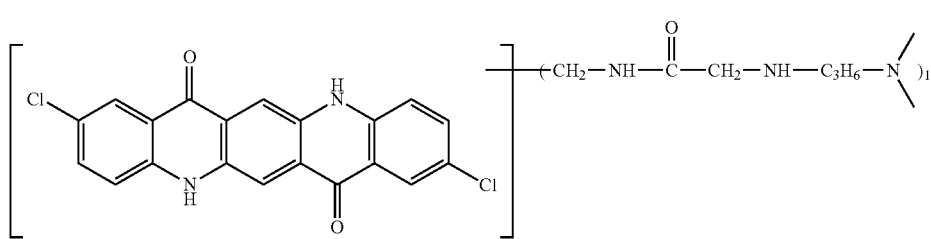

Chemical structure 7

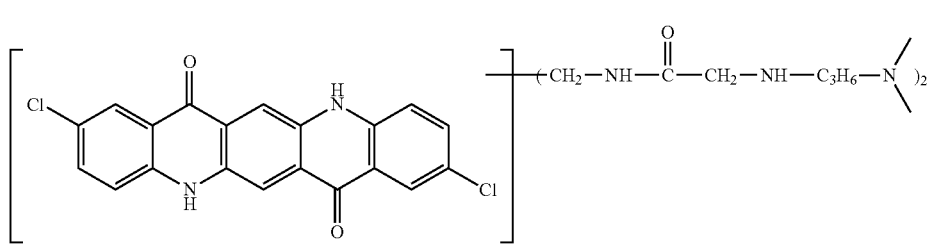

Chemical structure 8

The quinacridone compounds and copolymers of Examples 1-36 and Comparative Examples 1-6 are shown in the following Table.

TABLE 1

| | Chemical formula 1 | | | | | | | | Positive ion molecule peak | Negative ion molecule peak |
|---|---|---|---|---|---|---|---|---|---|---|
| | $R^1$ | $R^2$ | $R^3$ | $R^4$ | $R^5$ | $R^6$ | $R^7$ | m | | |
| Example 1 | H | H | H | H | $CH_3$ | $CH_3$ | $C_3H_6$ | 1 or 2 | 484.6 655.8 | 482.6 |
| Example 2 | H | H | H | H | $CH_3$ | $CH_3$ | $C_3H_6$ | 1 or 2 | 484.6 655.8 | 482.6 |
| Example 3 | H | H | H | H | $CH_3$ | $CH_3$ | $C_3H_6$ | 1 or 2 | 484.6 655.8 | 482.6 |
| Example 4 | H | H | H | H | $CH_3$ | $CH_3$ | $C_3H_6$ | 1 or 2 | 484.6 655.8 | 482.6 |
| Example 5 | H | H | H | H | $CH_3$ | $CH_3$ | $C_3H_6$ | 1 or 2 | 484.6 655.8 | 482.6 |
| Example 6 | H | H | H | H | $CH_3$ | $CH_3$ | $C_3H_6$ | 1 or 2 | 484.6 655.8 | 482.6 |
| Example 7 | H | H | H | H | $CH_3$ | $CH_3$ | $C_3H_6$ | 1 or 2 | 484.6 655.8 | 482.6 |
| Example 8 | H | H | H | H | $CH_3$ | $CH_3$ | $C_3H_6$ | 1 or 2 | 484.6 655.8 | 482.6 |
| Example 9 | H | H | H | H | $CH_3$ | $CH_3$ | $C_3H_6$ | 1 or 2 | 484.6 655.8 | 482.6 |
| Example 10 | H | H | H | H | $CH_3$ | $CH_3$ | $C_3H_6$ | 1 or 2 | 484.6 655.8 | 482.6 |
| Example 11 | H | H | H | H | $CH_3$ | $CH_3$ | $C_3H_6$ | 1 or 2 | 484.6 655.8 | 482.6 |
| Example 12 | H | H | H | H | $CH_3$ | $CH_3$ | $C_3H_6$ | 1 or 2 | 484.6 655.8 | 482.6 |
| Example 13 | H | H | H | H | $CH_3$ | $CH_3$ | $C_3H_6$ | 1 or 2 | 484.6 655.8 | 482.6 |
| Example 14 | H | H | H | H | $CH_3$ | $CH_3$ | $C_3H_6$ | 1 or 2 | 484.6 655.8 | 482.6 |
| Example 15 | H | H | H | H | $CH_3$ | $CH_3$ | $C_3H_6$ | 1 or 2 | 484.6 655.8 | 482.6 |
| Example 16 | H | H | H | H | $CH_3$ | $CH_3$ | $C_3H_6$ | 1 or 2 | 484.6 655.8 | 482.6 |

TABLE 1-continued

| | | | | | | | | | |
|---|---|---|---|---|---|---|---|---|---|
| Example 17 | H | H | H | H | $CH_3$ | $CH_3$ | $C_3H_6$ | 1 or 2 | 484.6 655.8 | 482.6 |

| | Chemical formula 2 | | Copolymer | | |
|---|---|---|---|---|---|
| | | | Anionic | Nonionic | |
| | $R^8$ | $L_1$ | group | group | Mw |
| Example 1 | $CH_3$ | $C_6H_{12}$ | No | Yes | 15,200 |
| Example 2 | $CH_3$ | $C_6H_{12}$ | No | Yes | 14900 |
| Example 3 | $CH_3$ | $C_6H_{12}$ | No | Yes | 15400 |
| Example 4 | $CH_3$ | $C_6H_{12}$ | No | Yes | 14,800 |
| Example 5 | $CH_3$ | $C_6H_{12}$ | No | Yes | 14,800 |
| Example 6 | $CH_3$ | $C_6H_{12}$ | No | Yes | 15,700 |
| Example 7 | $CH_3$ | $C_6H_{12}$ | No | Yes | 14,500 |
| Example 8 | $CH_3$ | $C_6H_{12}$ | Yes | Yes | 15,300 |
| Example 9 | $CH_3$ | $C_6H_{12}$ | Yes | Yes | 14,700 |
| Example 10 | $CH_3$ | $C_2H_4$ | No | Yes | 15,000 |
| Example 11 | $CH_3$ | $C_{12}H_{24}$ | No | Yes | 14,900 |
| Example 12 | $CH_3$ | $C_{16}H_{32}$ | No | Yes | 15,400 |
| Example 13 | $CH_3$ | $C_6H_{12}$ | No | Yes | 5,100 |
| Example 14 | $CH_3$ | $C_6H_{12}$ | No | Yes | 7,600 |
| Example 15 | $CH_3$ | $C_6H_{12}$ | No | Yes | 25,600 |
| Example 16 | $CH_3$ | $C_6H_{12}$ | No | Yes | 39,200 |
| Example 17 | $CH_3$ | $C_6H_{12}$ | No | Yes | 51,800 |

TABLE 2

| | Chemical formula 1 | | | | | | | | | |
|---|---|---|---|---|---|---|---|---|---|---|
| | $R^1$ | $R^2$ | $R^3$ | $R^4$ | $R^5$ | $R^6$ | $R^7$ | m | Positive ion molecule peak | Negative ion molecule peak |
| Example 18 | H | H | H | H | $CH_3$ | $CH_3$ | $C_3H_6$ | 1 or 2 | 484.6 655.8 | 482.6 |
| Example 19 | H | H | H | H | $CH_3$ | $CH_3$ | $C_3H_6$ | 1 or 2 | 484.6 655.8 | 482.6 |
| Example 20 | H | H | H | H | $CH_3$ | $CH_3$ | $C_3H_6$ | 1 or 2 | 484.6 655.8 | 482.6 |
| Example 21 | H | H | H | H | $CH_3$ | $CH_3$ | $C_3H_6$ | 1 or 2 | 484.6 655.8 | 482.6 |
| Example 22 | H | H | H | H | $CH_3$ | $CH_3$ | $C_3H_6$ | 1 or 2 | 484.6 655.8 | 482.6 |
| Example 23 | H | H | H | H | $CH_3$ | $CH_3$ | $C_3H_6$ | 1 or 2 | 484.6 655.8 | 482.6 |
| Example 24 | H | H | H | H | $CH_3$ | $CH_3$ | $C_3H_6$ | 1 or 2 | 484.6 655.8 | 482.6 |
| Example 25 | H | H | H | H | $CH_3$ | $CH_3$ | $C_3H_6$ | 1 or 2 | 484.6 655.8 | 482.6 |
| Example 26 | H | H | H | H | $CH_3$ | $CH_3$ | $C_3H_6$ | 1 or 2 | 484.6 655.8 | 482.6 |
| Example 27 | H | H | H | H | $CH_3$ | $CH_3$ | $C_3H_6$ | 1 or 2 | 484.6 655.8 | 482.6 |
| Example 28 | H | H | H | H | $CH_3$ | $CH_3$ | $C_3H_6$ | 1 or 2 | 484.6 655.8 | 482.6 |
| Example 29 | H | H | H | H | $CH_3$ | $CH_3$ | $C_3H_6$ | 1 or 2 | 484.6 655.8 | 482.6 |

TABLE 2-continued

| | | | | | | | | | | |
|---|---|---|---|---|---|---|---|---|---|---|
| Example 30 | H | H | H | H | $CH_3$ | $CH_3$ | $C_3H_6$ | 1 or 2 | 484.6 655.8 | 482.6 |
| Example 31 | H | H | H | H | $CH_3$ | $CH_3$ | $C_3H_6$ | 1 or 2 | 484.6 655.8 | 482.6 |
| Example 32 | H | H | H | H | $CH_3$ | $CH_3$ | $C_3H_6$ | 1 or 2 | 484.6 655.8 | 482.6 |
| Example 33 | H | H | H | H | $CH_3$ | $CH_3$ | $C_3H_6$ | 1 or 2 | 484.6 655.8 | 482.6 |
| Example 34 | H | H | H | H | $CH_3$ | $CH_3$ | $C_3H_6$ | 1 or 2 | 484.6 655.8 | 482.6 |

| | Chemical formula 3 | | Copolymer | | |
|---|---|---|---|---|---|
| | $R^9$ | $L_1$ | Anionic group | Nonionic group | Mw |
| Example 18 | $CH_3$ | $C_6H_{12}$ | No | Yes | 15000 |
| Example 19 | $CH_3$ | $C_6H_{12}$ | No | Yes | 15,000 |
| Example 20 | $CH_3$ | $C_6H_{12}$ | No | Yes | 15,000 |
| Example 21 | $CH_3$ | $C_6H_{12}$ | No | Yes | 15,000 |
| Example 22 | $CH_3$ | $C_6H_{12}$ | No | Yes | 15,000 |
| Example 23 | $CH_3$ | $C_6H_{12}$ | No | Yes | 15,500 |
| Example 24 | $CH_3$ | $C_6H_{12}$ | No | Yes | 14,600 |
| Example 25 | $CH_3$ | $C_6H_{12}$ | Yes | Yes | 15,100 |
| Example 26 | $CH_3$ | $C_6H_{12}$ | Yes | Yes | 14,800 |
| Example 27 | $CH_3$ | Single bond | No | Yes | 15,000 |
| Example 28 | $CH_3$ | $C_2H_4$ | No | Yes | 15,000 |
| Example 29 | $CH_3$ | $C_{16}H_{32}$ | No | Yes | 15,300 |
| Example 30 | $CH_3$ | $C_6H_{12}$ | No | Yes | 5,200 |
| Example 31 | $CH_3$ | $C_6H_{12}$ | No | Yes | 7,700 |
| Example 32 | $CH_3$ | $C_6H_{12}$ | No | Yes | 25,000 |
| Example 33 | $CH_3$ | $C_6H_{12}$ | No | Yes | 39,600 |
| Example 34 | $CH_3$ | $C_6H_{12}$ | No | Yes | 50,600 |

TABLE 3

| | Chemical formula 1 | | | | | | | | Positive ion molecule peak | Negative ion molecule peak |
|---|---|---|---|---|---|---|---|---|---|---|
| | $R^1$ | $R^2$ | $R_3$ | $R_4$ | $R_5$ | $R^6$ | $R^7$ | m | | |
| Comparative Example 1 | — | — | — | — | — | — | — | — | — | — |
| Comparative Example 2 | — | — | — | — | — | — | — | — | — | — |
| Comparative Example 3 | H | H | H | H | $CH_3$ | $CH_3$ | $C_3H_6$ | 1 or 2 | 484.6 655.8 | 482.6 |
| Comparative Example 4 | H | H | H | H | $CH_3$ | $CH_3$ | $C_3H_6$ | 1 or 2 | 484.6 655.8 | 482.6 |

TABLE 3-continued

| | Chemical formula 2 | | Chemical formula 3 | | Copolymer | | |
|---|---|---|---|---|---|---|---|
| | $R^8$ | $L_1$ | $R^9$ | $L_2$ | Anionic group | Nonionic group | Mw |
| Comparative Example 1 | $CH_3$ | $C_6H_{12}$ | — | — | No | Yes | 15,200 |
| Comparative Example 2 | $CH_3$ | $C_6H_{12}$ | — | — | No | Yes | 15,200 |
| Comparative Example 3 | — | — | — | — | — | — | — |
| Comparative Example 4 | — | — | — | — | — | — | — |
| Comparative Example 5 | — | — | $CH_3$ | $C_6H_{12}$ | No | Yes | 15,000 |
| Comparative Example 6 | — | — | $CH_3$ | $C_6H_{12}$ | No | Yes | 15,000 |

(Comparative Example 5 and Comparative Example 6 rows above the header show all dashes.)

TABLE 4

| | Chemical formula 1 | | | | | | | | Positive ion molecule peak | Negative ion molecule peak |
|---|---|---|---|---|---|---|---|---|---|---|
| | $R^1$ | $R^2$ | $R^3$ | $R^4$ | $R^5$ | $R^6$ | $R_7$ | m | | |
| Example 35 | $CH_3$ | H | H | $CH_3$ | $CH_3$ | $CH_3$ | $C_3H_6$ | 1 or 2 | 512.6 683.9 | 510.6 |
| Example 36 | Cl | H | H | Cl | $CH_3$ | $CH_3$ | $C_3H_6$ | 1 or 2 | 552.5 723.7 | 551.5 |

| | Chemical formula 2 | | Copolymer | | |
|---|---|---|---|---|---|
| | $R^8$ | $L_1$ | Anionic group | Nonionic group | Mw |
| Example 35 | $CH_3$ | $C_6H_{12}$ | No | Yes | 15,200 |
| Example 36 | $CH_3$ | $C_6H_{12}$ | No | Yes | 15,200 |

The pigment dispersions and inks of Examples 1-36 and Comparative Examples 1-6 were evaluated with regard to the storage stability of the pigment dispersions and the storage stability and the discharging stability of the inks according to the following methods. The evaluation method is as follows. In addition, the evaluation results are shown in Tables 5-8.

Evaluation

Storage Stability of Pigment Dispersion

A glass container was filled with each pigment dispersion element and stored at 70 degrees C. for 2 weeks. The change rate of the viscosity after the storage to the viscosity before the storage was obtained from the following relation and evaluated according to the following criteria.

Change rate of viscosity (%)=Viscosity of pigment dispersion after storage−Viscosity of pigment dispersion before storage)/(Viscosity of pigment dispersion before storage)×100    Relation 1

The viscosity was measured by a viscometer (RE80L, manufactured by TOKI SANGYO CO., LTD.) to measure the viscosity of the ink at 25 degrees C. at 50 rotations. The grades A and B are allowable.

Evaluation Criteria

A: Change rate of viscosity within + or −3%
B: Change rate of viscosity within the range of from −5% to less than −3% and more than 3% to 5%
C: Change rate of viscosity within the range of from −8% to less than −5% and more than 5% to 8%.
D: Change rate of viscosity within the range of from −10% to less than −8% and more than 8% to 10%
E: Change rate of viscosity within the range of from −30% to less than −10% and more than 10% to 30%
F: Change rate of viscosity less than −30% or greater than 30% (gelated to the degree that evaluation was not possible)

Storage Stability of Ink

An ink cartridge was filled with each ink and stored at 70 degrees C. for one week. The change rate of the viscosity after the storage to the viscosity before the storage was obtained from the following relation and evaluated according to the following criteria. The grades A and B are allowable.

Change rate of viscosity (%)=(Viscosity of ink after storage−Viscosity of ink before storage)/(Viscosity of ink before storage)×100    Relation 2

The viscosity was measured by a viscometer (RE80L, manufactured by TOKI SANGYO CO., LTD.) to measure the viscosity of the ink at 25 degrees C. at 50 rotations.

Discharging Stability

An Inkjet printer (IPSiO GX-e5500, manufactured by Ricoh Company Ltd.) was filled with each ink. Images were continuously printed for 10 minutes using the printer. After leaving the printer at 50 degrees C. and 60 percent RH for one month with a moisture retention cap on the head surface while the ink was attached to the surface, the head surface was cleaned and the printer was returned to the same state as before the leaving for one month. Thereafter, an intermittent printing test was conducted under the following conditions and the discharging stability was evaluated.

That is, the following print pattern chart was printed on 20 sheets continuously and the printing was halt for 20 minutes. This cycle was repeated 50 times to print the chart on 1,000 sheets in total and thereafter the printing pattern chart was printed on one more sheet, which was visually confirmed to evaluate the image with regard to streaks, dot missing, disturbance of spraying of 5 percent chart solid portion according to the following criteria. The print pattern had a print area for each color accounting for 5 percent of the entire area of the sheet and was printed with each ink with 100 percent duty. The print conditions were that the print density was 600 dpi×300 dpi with one pass printing. The evaluation criteria are as follows. The grades A and B are allowable.

Evaluation Criteria

A: no streaks, no dot missing, no jetting disturbance observed in solid portion

B: slight streaks, dot missing, and jetting disturbance observed in the solid portion C: streaks, dot missing, and jetting disturbance observed in the solid portion D: streaks, dot missing, and jetting disturbance observed all over the solid portion

TABLE 5

| | Pigment dispersion | Ink | |
|---|---|---|---|
| | Storage Stability | Storage Stability | Discharging stability |
| Example 1 | A | B | A |
| Example 2 | A | B | A |
| Example 3 | A | B | A |
| Example 4 | A | B | A |
| Example 5 | A | B | A |
| Example 6 | A | B | A |
| Example 7 | A | B | A |
| Example 8 | A | A | A |
| Example 9 | A | A | A |
| Example 10 | A | B | A |
| Example 11 | B | A | A |
| Example 12 | B | A | B |
| Example 13 | B | B | A |
| Example 14 | A | B | A |
| Example 15 | A | A | B |
| Example 16 | A | A | B |
| Example 17 | B | A | B |

TABLE 6

| | Pigment dispersion | Ink | |
|---|---|---|---|
| | Storage Stability | Storage Stability | Discharging stability |
| Example 18 | A | B | A |
| Example 19 | A | B | A |
| Example 20 | A | B | A |
| Example 21 | A | B | A |
| Example 22 | A | B | A |
| Example 23 | A | B | A |
| Example 24 | A | B | A |
| Example 25 | A | A | A |
| Example 26 | A | A | A |
| Example 27 | B | B | A |
| Example 28 | B | A | A |
| Example 29 | B | A | B |
| Example 30 | B | B | A |
| Example 31 | A | B | A |
| Example 32 | A | A | B |
| Example 33 | A | A | B |
| Example 34 | B | A | B |

TABLE 7

| | Pigment dispersion | Ink | |
|---|---|---|---|
| | Storage Stability | Storage Stability | Discharging stability |
| Comparative Example 1 | B | D | B |
| Comparative Example 2 | E | D | D |
| Comparative Example 3 | E | D | D |
| Comparative Example 4 | D | D | C |
| Comparative Example 5 | B | D | B |
| Comparative Example 6 | E | D | D |

TABLE 8

| | Pigment dispersion | Ink | |
|---|---|---|---|
| | Storage Stability | Storage Stability | Discharging stability |
| Example 35 | A | B | A |
| Example 36 | A | B | A |

The pigment dispersions and the inks manufactured by using the quinacridone compound represented by the Chemical formula 1 and the copolymers including the structure unit represented by the Chemical formula 2 or Chemical formula 3 of the present disclosure of Examples 1-36 are found to have excellent storage stability of the pigment dispersions and the inks and excellent discharging stability of the inks in comparison with Comparative Examples 1-6.

According to the present disclosure, an ink is provided which has excellent storage stability and discharging stability.

Having now fully described embodiments of the present invention, it will be apparent to one of ordinary skill its the art that many changes and modifications can be made thereto without departing from the spirit and scope of embodiments of the invention as set forth herein.

What is claimed is:

1. An ink comprising:

a pigment;

a quinacridone compound represented by the following Chemical formula 1; and a copolymer including a structure unit represented by the following Chemical formula 2 or Chemical formula 3, Chemical formula 1

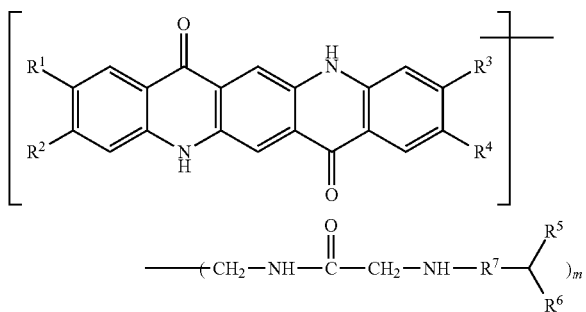

where $R^1$, $R^2$, $R^3$, and $R^4$ each, independently represent hydrogen atoms, halogen atoms, or alkyl groups having 1-4 carbon atoms, $R^5$, $R^6$ and $R^7$ each, independently represent alkyl groups having 1-4 carbon atoms or alkylene groups having 1-4 carbon atoms, and m represents 1 or 2, Chemical formula 2

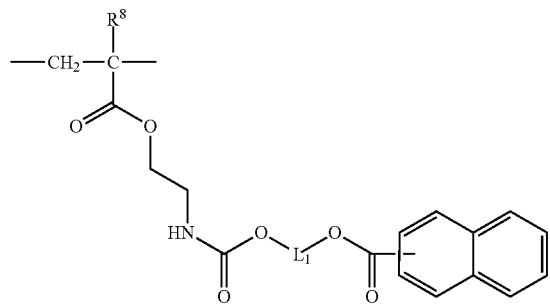

where $R^8$ represents a hydrogen atom or a methyl group and $L_1$ represents an alkylene group having 2-16 carbon atoms.

Chemical formula 3

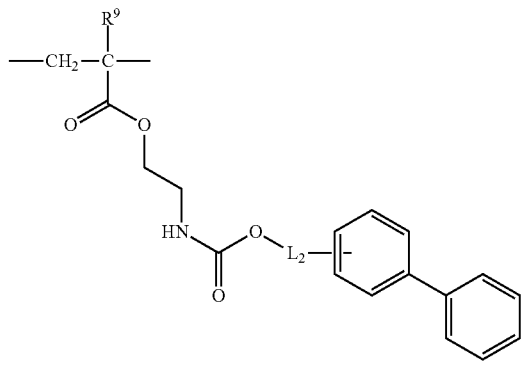

where, $R^9$ represents a hydrogen atom or a methyl group, $L_2$ represents a single bond or $-(CH_2)_n-O-$ and n represents an integer of 2-16.

2. The ink according to claim 1, wherein at least one peak selected from positive ion molecule peaks of 483.6-485.6, 511.6-513.6, 552.5-554.5, 654.8-656.8, 682.9-684.9, and 723.7-725.7 and negative ion molecule peak of 481.6-483.6, 509.6-511.6, 550.5-552.5, 652.8-654.8, 680.9-682.9, and 721.7-723.7 is observed as the quinacridone compound is measured according to matrix assisted laser desorption ionization time of flight mass spectrometry.

3. The ink according to claim 1, wherein the pigment includes a quinacridone-based pigment.

4. The ink according to claim 1, wherein the copolymer includes an anionic group or a nonionic group.

5. The ink according to claim 1, wherein $L_1$ in the Chemical formula 2 is an alkylene group having 2-12 carbon atoms.

6. The ink according to claim 1, wherein the copolymer has a weight average molecular weight Mw of 7,000-40,000.

7. Recorded matter comprising:

a recording medium; and an image or information recorded on the recording medium using the ink of claim 1.

8. An ink container comprising:

an ink containing unit; and the ink of claim 1 contained in the ink containing unit.

9. A recording device comprising:

the ink of claim 1; and an ink discharging device including a recording head to discharge the ink to a recording medium to record information or an image on the recording medium.

10. A recording method comprising:

applying a stimulus to the ink of claim 1 by an ink discharging device including a recording head; and discharging the ink from the recording head onto a recording medium to record information or an image on the recording medium.

* * * * *